(12) United States Patent
Fu

(10) Patent No.: US 10,157,165 B2
(45) Date of Patent: Dec. 18, 2018

(54) METHODS AND DEVICES FOR REDUCING ARRAY SIZE AND COMPLEXITY IN AUTOMATA PROCESSORS

(71) Applicant: MICRON TECHNOLOGY, INC., Boise, ID (US)

(72) Inventor: Yao Fu, Castro Valley, CA (US)

(73) Assignee: Micron Technology, Inc., Boise, ID (US)

( * ) Notice: Subject to any disclaimer, the term of this patent is extended or adjusted under 35 U.S.C. 154(b) by 118 days.

(21) Appl. No.: 15/166,462

(22) Filed: May 27, 2016

(65) Prior Publication Data

US 2016/0357704 A1 Dec. 8, 2016

Related U.S. Application Data

(60) Provisional application No. 62/171,662, filed on Jun. 5, 2015.

(51) Int. Cl.

| G06F 7/02 | (2006.01) |
|---|---|
| H03M 13/00 | (2006.01) |
| G06F 15/80 | (2006.01) |
| G06F 17/30 | (2006.01) |
| G05B 19/045 | (2006.01) |

(52) U.S. Cl.
CPC .......... G06F 15/80 (2013.01); G05B 19/045 (2013.01); G06F 17/30985 (2013.01); G05B 2219/24059 (2013.01)

(58) Field of Classification Search
CPC ............... G06F 15/80; G06F 17/30985; G06F 17/2211; G06F 3/03545; G06F 3/0321; G05B 19/045; G06K 7/1443; G06K 9/22; G06K 19/06037; G06K 2009/226; H04N 1/4115; H04N 1/417; G06T 9/001; C07K 1/00; C12N 15/11; G09G 5/00
See application file for complete search history.

(56) References Cited

U.S. PATENT DOCUMENTS

| 4,922,545 A * | 5/1990 | Endoh | ................. H04N 1/4115 358/1.9 |
|---|---|---|---|
| 5,511,159 A * | 4/1996 | Baker | ...................... C07K 1/00 707/E17.039 |
| 6,122,402 A * | 9/2000 | Arai | ........................ G06T 9/001 382/229 |
| 7,145,556 B2 * | 12/2006 | Pettersson | ........... G06F 3/03545 178/19.01 |
| 2015/0156102 A1 | 6/2015 | Szabo et al. | |

OTHER PUBLICATIONS

Cookbook, Micron 2013.*
Paul Dlugosch et al; An Efficient and Scalable Semiconductor Architecture for Parallel Automata Processing; IEEE 2014; pp. 1-11; vol. 25; IEEE Transaction on Parallel and Distributed Systems.

(Continued)

*Primary Examiner* — Guerrier Merant
(74) *Attorney, Agent, or Firm* — Fletcher Yoder, P.C.

(57) ABSTRACT

A method includes calculating a first position encoded pattern based on a first data pattern, and using an automata processor to compare the first position encoded pattern to a second position encoded pattern to identify a second data pattern within the first data pattern.

25 Claims, 14 Drawing Sheets

(56) References Cited

OTHER PUBLICATIONS

Paul Dlugosch et al; Supplementary Material for an Efficient and Scalable Semiconductor Architecture for Parallel Automata Processing; IEEE 2013; pp. 1-5; IEEE Transaction on Parallel and Distributed Systems.
Paul Dlugosch, The Automata Processor—Practical Processing in Memory, how to article, May 27, 2014.
Christopher Sabotta, 'Advantages and challenges of programming the Micron Automata Processor', Iowa State University, Graduate Theses and Dissertations, 2013, Paper 13613, <URL: http://lib:dr.iastate.edu/cgi/viewcontent. cgi?article=4620&context=etd> See pp. 20, 23.
Keira Zhou et al., 'Bri II tagging on the Micron Automata Processor', In: Semantic Computing (ICSC), 2015 IEEE International Conference on, Anaheim, CA, Feb. 7-9, 2015, pp. 1-8. <URL: http://ieeexplore.ieee.org/xpls/abs_all.jsp?arnumber=7050812&tag=1> See pp. 2-5.
International Search Report and Written Opinion, PCT Application No. PCT/US16/35309; dated Oct. 6, 2016.

\* cited by examiner

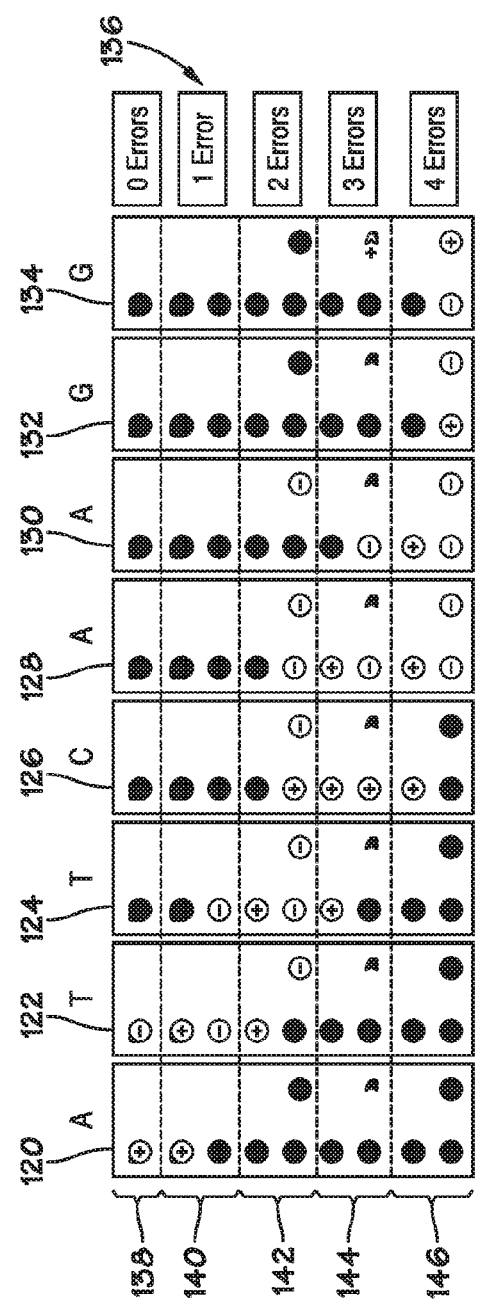
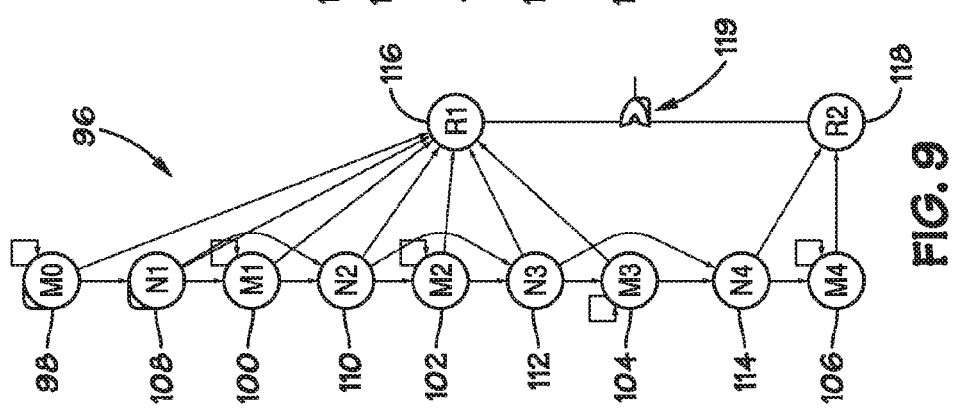
FIG. 10
FIG. 9

METHODS AND DEVICES FOR REDUCING ARRAY SIZE AND COMPLEXITY IN AUTOMATA PROCESSORS

CROSS REFERENCE TO RELATED APPLICATIONS

This application is a Non-Provisional application claiming priority to U.S. Provisional Patent Application No. 62/171,662, entitled "Methods and Devices for Reducing Array Size and Complexity in Automata Processors," filed Jun. 5, 2015, which is herein incorporated by reference.

BACKGROUND

Field of Invention

Embodiments of the invention relate generally to automata processors, and more specifically, to reducing array size and complexity in automata processors.

Description of Related Art

Certain apparatuses, such as computational electronic devices and systems, may include a number of processing resources (e.g., one or more processors), which may retrieve and execute instructions and store the results of the executed instructions to a suitable location. For example, the processing resources may include a number of functional units, arithmetic units, and similar circuitry to execute instructions by performing a number of Boolean logical operations and arithmetic functions. One particular processing resource may include an automata-based processing resource, which may be suitable for use in applications such as, for example, network security, computational biology, image processing, text searching, and so forth. These automata-based processing resources, may include, or may be described for example, by a number of state elements and signal transitions among these state elements. Each state element of the automata-based processing resources may store and/or recognize one/a number of particular data value. Using automata processor to identify (e.g., search for or match) signal patterns may lead to overly complex arrays of state elements and state transitions, and, by extension, an inefficient use of system resources (e.g., processing power, physical area, processing speed, and so forth). It may be useful to provide devices and methods to increase processing and performance efficiency of automata-based processing resources.

BRIEF DESCRIPTION OF DRAWINGS

FIGS. 9 and 10 illustrate block diagrams of STEs and examples of identifying sequential data patterns including mismatch errors and substitution errors, in accordance with an embodiment;

FIGS. 15-17A and 17B illustrate block diagrams of STEs and examples of identifying sequential data patterns including deletion errors and insertion errors with increased length capacity, in accordance with an embodiment.

DETAILED DESCRIPTION

Present embodiments relate to various encoding techniques and automata processor embodiments that may facilitate and improve the utilization of state transition elements (STEs) of, for example, an automaton or automata processor. Indeed, in certain embodiments, the automaton or automata processor may encode sequential position information together with data pattern symbols to generate a position encoded pattern symbol by which to compare data patterns and identify data patterns within input data patterns (which may be referred to by example hereinafter as finding a "match" or detecting a "hit") via parallel processing. As the position encoded patterns and data symbols include position information, the states and transitions representing position information to identify sequential data patterns may be merged into single or relatively low number of states and transitions with respect to each state transition element (STE) of the automaton or automata processor.

In this way, the array size of STEs within the automaton or automata processor may be markedly reduced, and may thus contribute to increased processing and performance efficiency of the automaton or automata processor. The present embodiments may also include techniques to facilitate and improve the approximation of an identification of a data pattern (e.g., sequential data pattern) within one or more input data patterns (which can be, for example, either received as a data stream or stored in a memory array) by allowing for mismatch errors, substitution errors, deletion errors, and insertion errors between data symbols of the identifiable data pattern and those of the one or more input data patterns.

It should be appreciated that as used herein, "row" may refer to at least one axis of an array of cells (e.g., memory cells). Similarly, "column" may refer to at least one other axis of the array of cells (e.g., memory cells) that may intersect and/or extend in a direction perpendicular to the row axis. Indeed, the "rows" and the "columns" may be respectively understood to refer to any one of at least two axes, in which the two axes are substantially perpendicular. In other words, the "rows" may or may not necessarily be horizontal, and the "columns" may or may not necessarily be vertical, and vice-versa. Furthermore, an "automata processor" or "automaton processor" may refer to any programmable or otherwise configurable device that may be utilized to perform high efficiency data searches, analyses, and processing of complex structured and unstructured data patterns, often as part of a parallel process.

Figure 1:
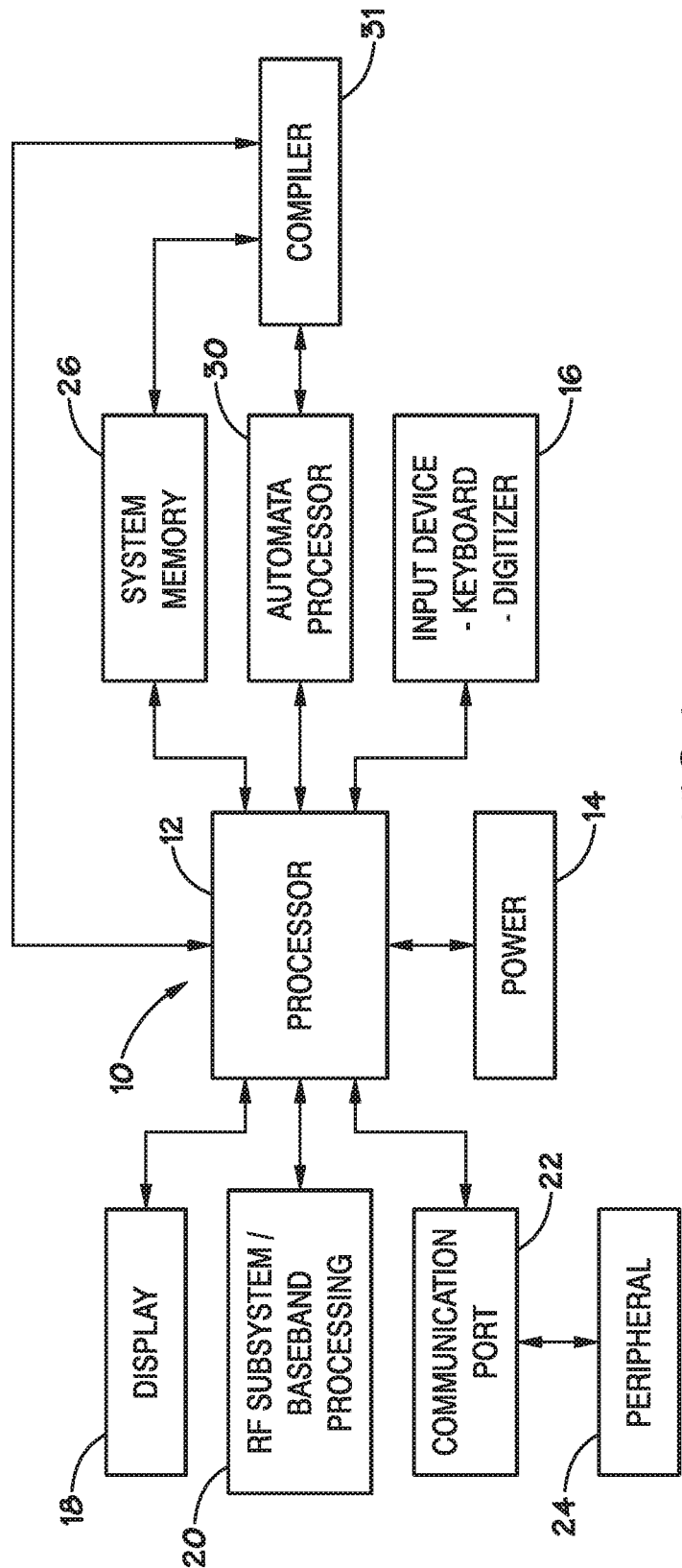
FIG. 1 illustrates a block diagram of a system including an automata processor, in accordance with an embodiment.

With the foregoing in mind, it may be useful to describe an embodiment of a processor-based system, such as the processor-based system 10 illustrated in FIG. 1. The processor-based system 10 may include any of various electronic devices such as, for example, computers, tablet computers, pagers, mobile phones, personal organizers, portable audio players, cameras, watches, industrial measurement electronic devices, and so forth. As illustrated, the processor-based system 10 may include a processor 12. The processor 12 (e.g., microprocessor) may be provided to control the processing of system functions and requests in the system 10. Further, the processor 12 may include a number of processors that share system control.

The processor-based system 10 may also include a power supply 14. For example, if the processor-based system 10 may be a portable system, the power supply 14 may include permanent batteries, replaceable batteries, and/or rechargeable batteries. The power supply 14 may also include an alternating current (AC) adapter, such that the processor-based system 10 may receive power from, for example, a wall outlet or other AC power source. The power supply 14 may also include a direct current (DC) adapter such that the processor-based system 10 may receive power from, for example, a DC power source.

Various other devices may be coupled to the processor 12 depending on the functions that the processor-based system 10 performs. For example, in certain embodiments, an input device 16 may be coupled to the processor 12. The input device 16 may include, for example, buttons, switches, a keyboard, a light pen, a stylus, a mouse, and/or a voice recognition system. The system 10 may also include a display 18, which may be coupled to the processor 12. The display 18 may include a liquid crystal display (LCD), a cathode ray tube (CRT), organic light emitting diode displays (OLEDs), and/or various other display technologies.

Furthermore, the system 10 may include a RF sub-system/baseband processor 20 that may be coupled to the processor 12. In one embodiment, the RF sub-system/baseband processor 20 may include one or more transceivers that may be useful in allowing the system 10 to communicate wirelessly. A communications port 22 may also be coupled to the processor 12. The communications port 22 may be adapted to be coupled to one or more peripheral devices 24 such as, for example, a modem, a printer, a computer, or to a network, such as a local area network, remote area network, intranet, or the Internet.

In certain embodiments, such as where the processor 12 may be used to control the functioning of the processor-based system 10 by executing instructions, a system memory 26 may be used to allow the processor 12 to efficiently carry out its functionality. As depicted, the system memory 26 may be coupled to the processor 12 to store and facilitate execution of various instructions. The system memory 26 may include volatile memory such as, for example, random access memory (RAM), dynamic random access memory (DRAM), static random access memory (SRAM), synchronous dynamic random access memory (SDRAM), and/or thyristor random access memory (TRAM). The system memory 26 may also include non-volatile memory such as, for example, read-only memory (ROM), EEPROM, NAND flash memory, NOR flash memory, phase change random access memory (PCRAM), resistive random access memory (RRAM), magnetoresistive random access memory (MRAM), and/or spin torque transfer random access memory (STT RAM).

In certain embodiments, the system 10 may also include one or more automata processors 30 that may be used to internally process instructions stored (e.g., written) to the system memory 26 (although discussed in the context of this embodiment as being used in the system memory 26). For example, as will be further appreciated, the automata processor(s) 30 may include various functional components, which may be referred to hereinafter as "elements" or "state transition elements (STE)" that may, in some embodiments, be woven into the hierarchy of routing matrices of the automata processor(s) 30 and may be used to store and process structured and unstructured data patterns. As further illustrated, the system 10 may include a compiler 31 communicatively coupled to the automata processor(s) 30. For example, in one embodiment, the complier 31 may be used to program the automata processor(s) 30.

Figure 2:
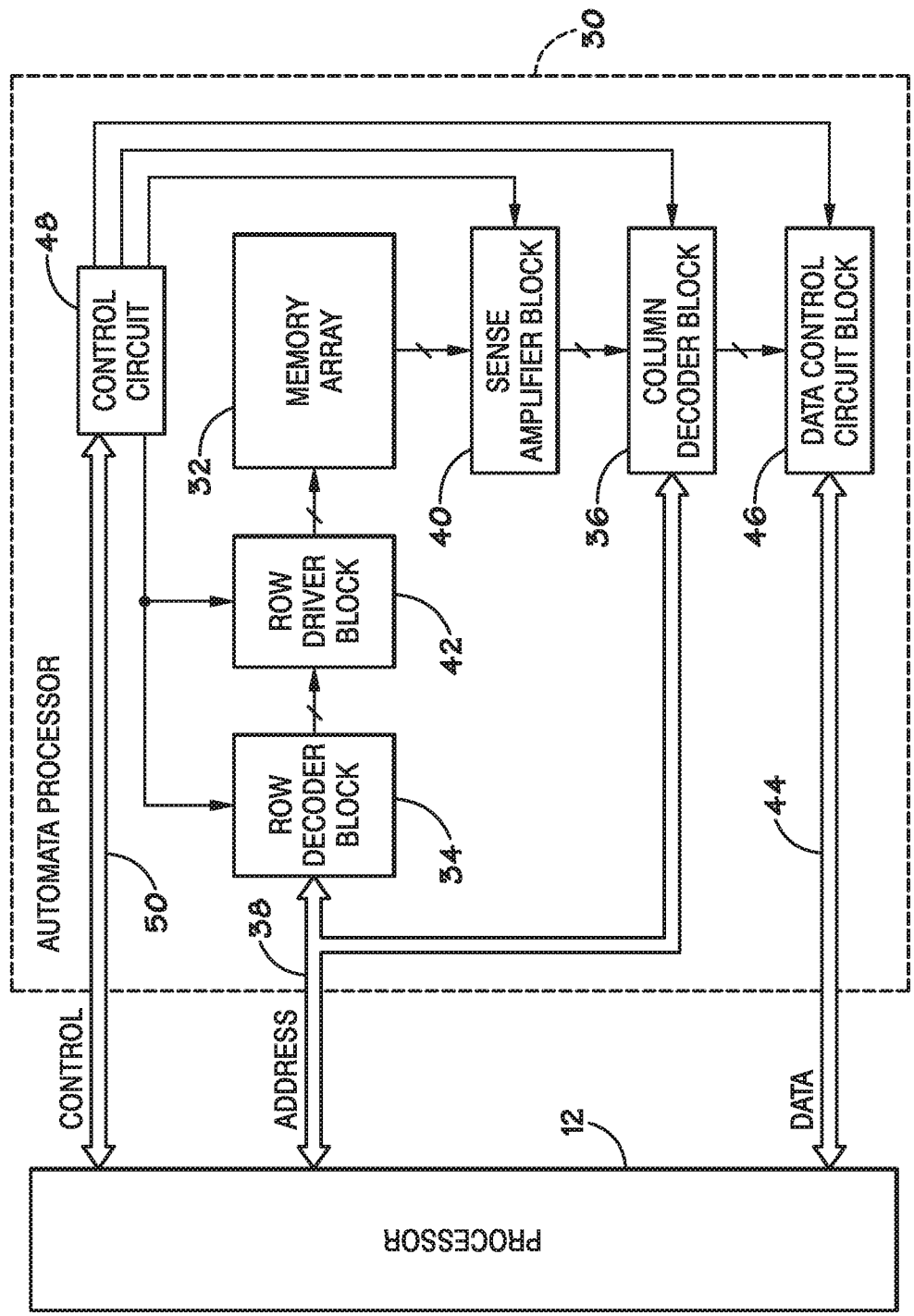
FIG. 2 illustrates a block diagram of the automata processor of FIG. 1, in accordance with an embodiment.

Turning now to FIG. 2, a block diagram of one embodiment of the automata processor(s) 30 of FIG. 1 is illustrated. As illustrated, in one embodiment, the automata processor(s) 30 may include a memory array 32. As will be further appreciated, the memory array 32 may include an array of rows (e.g., thousands of rows) and columns (e.g., hundreds of columns) of memory cells that are accessible and sensible by a number of access lines and data lines. The access lines are often referred to as "wordlines" (WL). The data lines are often referred to as "bit lines" (BL) or "digit lines" (DL). The size of the memory array 32 (e.g., the number of memory cells, rows, columns, wordlines and bit/digit lines) may vary between different devices.

As further illustrated, to access the memory array 32, a row decoder block 34 and a column decoder block 36 may be provided to receive and translate address information from the processor 12 via the address bus 38 to access a particular row of memory cells in the memory array 32. A sensing circuit, such as the sense amplifier block 40 including a number of the sense amplifiers, may be also provided between the column decoder 36 and the memory array 32 to sense individual data values stored in the memory cells of the memory array 32. Further, a row driver block 42 may be provided between the row decoder block 34 and the memory array 32 to activate a selected wordline in the memory array according to a given row address.

In certain embodiments, during read and program operations, such as a write operation, data may be transferred to and from the automata processor(s) 30 via the data bus 44. The coordination of the data and address information may be conducted through a data control circuit block 46. As further depicted, the automata processor(s) 30 may include control circuitry 48 that may be used to receive control signals from the processor 12 via the control bus 50. The control circuitry 48 may be coupled (e.g., communicatively coupled) to each of the row decoder block 34, the column decoder block 36, the sense amplifier block 40, the row driver block 42, and the data control circuit block 46, and may be used to coordinate timing and control among the various circuits included in the automata processor(s) 30.

The control circuitry 48 may decode signals provided by control bus 50 from the processor 12. In certain embodiments, these signals may include chip activate signals, write activate signals, and address latch signals that may be used to control operations performed via the memory array 32 such as, for example, data read, data write, and data erase operations. The control circuitry 48 may be responsible for executing instructions from the processor 12.

Figure 3:
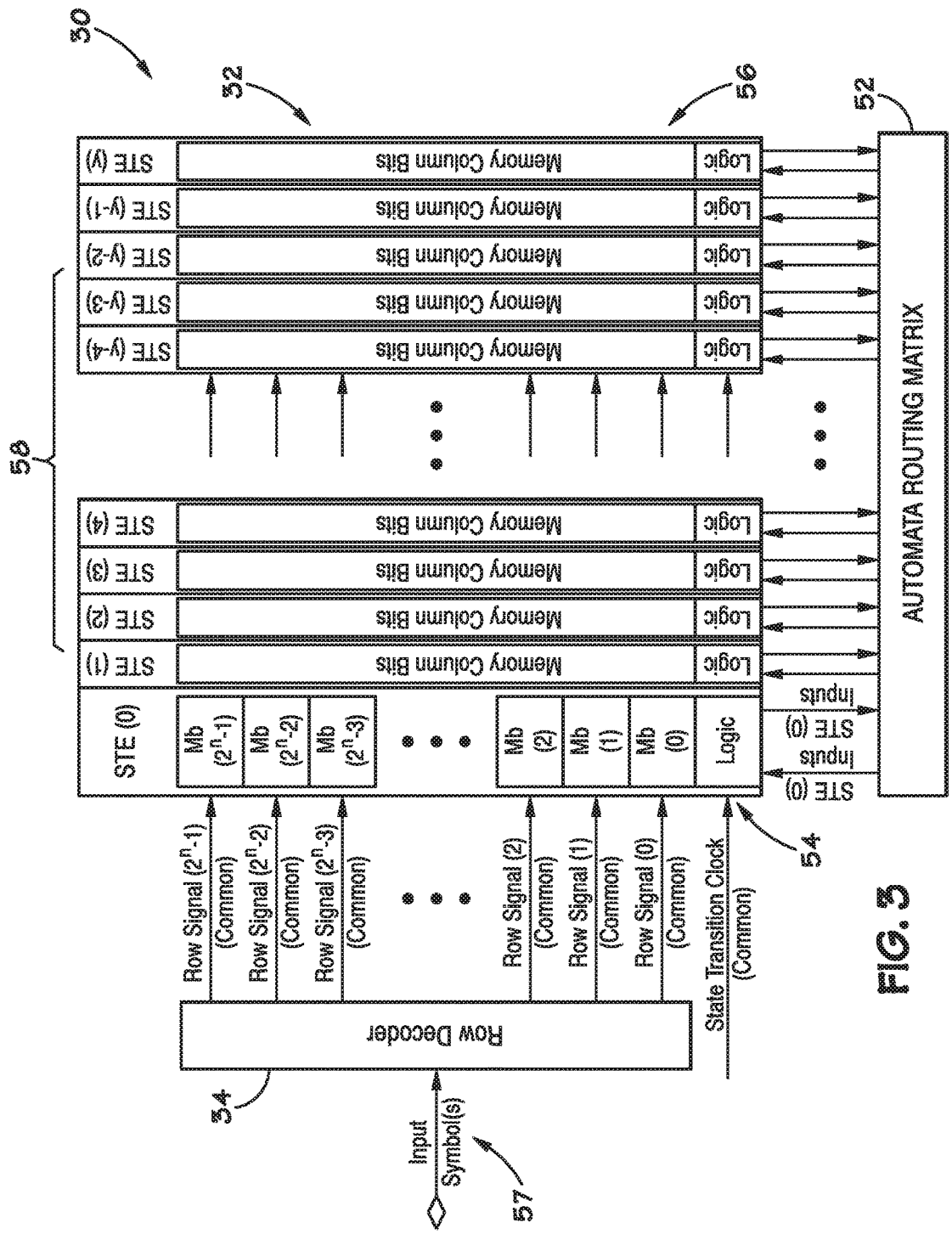
FIG. 3 illustrates a block diagram of an automata processor including a memory array and an routing matrix structure, in accordance with an embodiment.

In certain embodiments, the sense amplifier block 40 may include a number of sense amplifiers and a number of processing structures, which may include accumulator circuitry and may be used to perform Boolean logical operations and arithmetic functions. For example, the automata processor(s) 30 may include arithmetic logic unit (ALU) circuitry, floating point unit (FPU) circuitry, and/or a combinational logic block that may be used to execute instructions by performing arithmetic functions such as, for example, addition, subtraction, multiplication, and division, as well as Boolean logical operations such as, for example, AND, OR, NOT, NAND, NOR, and XOR, sum-of-products (SoP), and products-of-sums (PoS) Boolean logical operations on data (e.g., one or more operands). As illustrated by FIG. 3, the automata processor(s) 30 may include a routing matrix structure 52 that may be communicatively coupled to a state transition element (STE) memory array 58 (e.g., logic blocks 54 and columns 56 of memory cells). In certain embodiments, as further illustrated in FIG. 3, the row decoder 34 may receive one or more input symbols 57 (e.g., 8-bit symbols, 16-bit symbols, 32-bit symbols, 64-bit symbols, and so on).

In certain embodiments, as further illustrated in FIG. 3, the automata processor(s) 30 may be used to perform automata operations through the routing matrix structure 52 that may be included as part of the automata processor(s) 30. For example, in one embodiment, each automata processor(s) 30 and all the routing matrix structure 52 paths of the automata processor(s) 30 may operate in parallel (e.g., operating on the same input symbols 57 concurrently). Thus, the routing matrix structure 52 of the automata processor(s) 30 may provide interconnections at the various levels of a hierarchy within rows 54 of memory cells, columns 56 of memory cells, or functional blocks.

Figure 4:
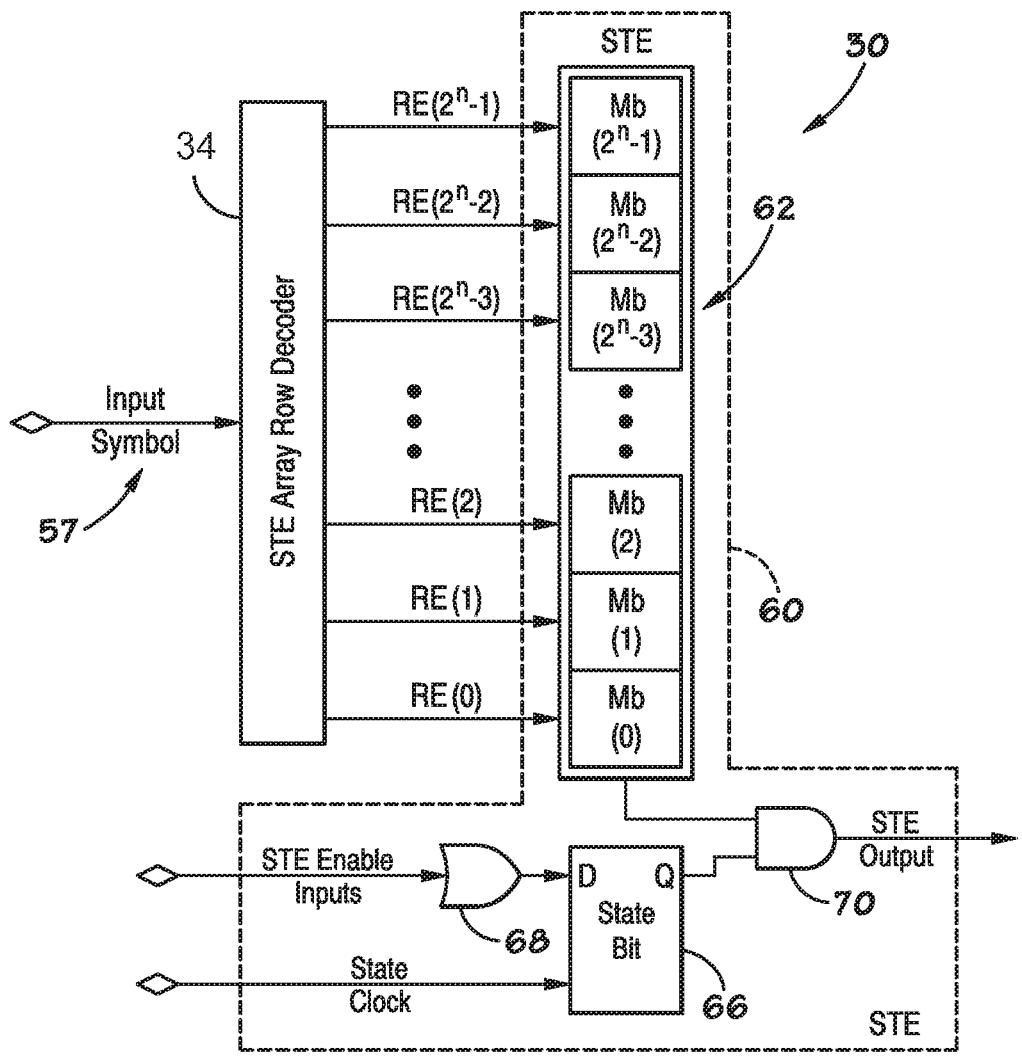
FIG. 4 illustrates a block diagram of a state transition element STE that may be included as part of the automata processing structure, in accordance with an embodiment.

In certain embodiments, the automata processor(s) 30 may include various "state transition elements" or STEs that may, in some embodiments, be woven into the hierarchy of the routing matrices 52 of the automata processor(s) 30. For example, FIG. 4 depicts a state transition element (STE) memory array 58, which may include an example STE 60. The STE 60 may include a current-state memory column 62 (e.g., column of memory cells) and the next-state decoder (e.g., logic 54 as previously discussed with respect to FIG. 3). It should be appreciated that while FIG. 4 illustrates a single STE 60, in certain embodiments, the automata processor(s) 30 may include an array of STEs 60 that may be implemented as a memory array with control and computational logic. For example, each column 62 of the memory array 32 may include logic 54 (e.g., as previously discussed with respect to FIG. 3) that contains a single state bit (e.g., that may be pre-stored) as illustrated by the flip-flop (FF) 66, enable inputs that may be input into a logical OR gate 68, and an output decoder and driver via logical AND gate 70. As depicted, the output may be generated based on the logical AND of the state bit output via the FF 66 and the output of the associated column of memory cells 62. In one embodiment, each state bit may include a logical value of "1" or reset logical value "0" based on whether that STE 60 is in an active or inactive state.

Figure 5:
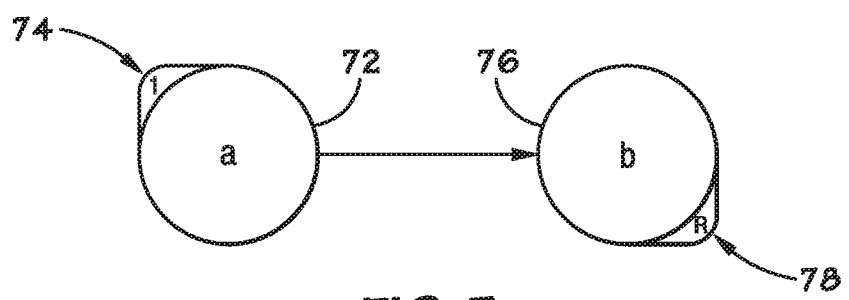
FIGS. 5-8 illustrate block diagrams of STEs and examples of identifying sequential data patterns, in accordance with an embodiment.

FIG. 5 illustrates an Automata Network Markup Language (ANML) (e.g., eXtensible Markup Language [XML] that may be used to describe an automata network) example of the operation of an STE 72 (e.g., start-state STE) and an STE 76 (e.g., next-state STE). The STE 72 may be start-enabled and include a start-state symbol 74 as indicated by the value "1" located in the upper left corner of the STE 72. The STE 72 may receive bytes of input data (e.g., input symbols 57), and report when a match of the input data (e.g., input symbols 57) is detected as indicated by the report symbol 78 located in the lower right corner of the next-state STE 76.

Figure 6:
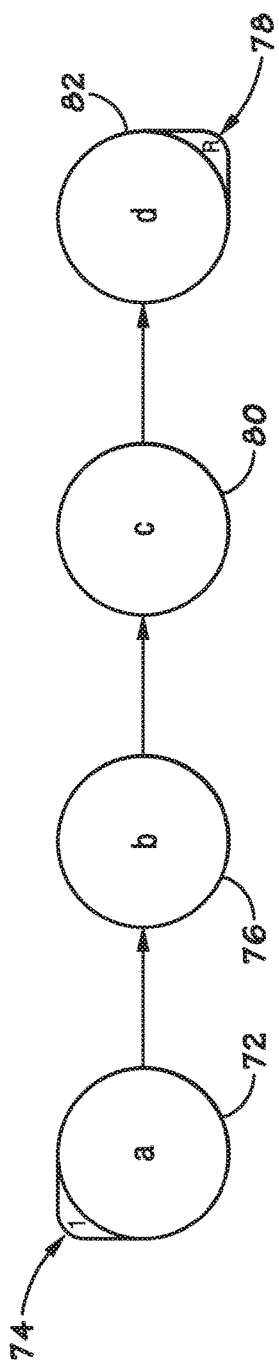

As a further example of the operations that may be performed by the STEs (e.g., STEs 72, 76) of the automata processor(s) 30, for example, a sequential symbol pattern identification problem may be solved via the STEs (e.g., STEs 72, 76, 80, 82) as illustrated in FIG. 6. For example, given a data pattern including characters "abcd," the STEs 72, 76, 80, 82 may be used to identify any input data pattern (e.g., input symbols 57) starting with the characters "abcd." For example, as depicted in FIG. 6, the STE 72 may recognize a symbol "a," and may then be activated at the start of the input data pattern (e.g., input symbols 57) as indicated by the start-state symbol 74 (e.g., the value "1" located in the upper left corner of the STE 72). Thus, when the input data pattern starts with an "a," the STE 72 will be matched and activate the STE 76 (e.g., next-state STE). The activated STE 76 may be then allowed to recognize a symbol "b" of the input data pattern. If the symbol "b" follows the first symbol "a," the STE 76 may be matched, and may then activate STE 80 (e.g., next-state STE). The STE 80 may then recognize symbol "c." It then follows that if "c" is the next input symbol of the input data pattern, the STE 80 will be matched, and may subsequently activate the STE 82. Lastly, if the next input symbol of the input data pattern is "d," the reporting STE 82 will be matched and report that the pattern has been identified (e.g., indicated by the report symbol 78 located in the lower right corner of the STE 82). However, if there is any position (e.g., "a," "b," "c," "d") of the input data pattern that does not match its corresponding STE (e.g., STE 72 corresponding to "a," STE 76 corresponding to "b," STE 80 corresponding to "c," STE 82 corresponding to "d,"), the reporting STE 82 will not report a match.

In certain embodiments, it may be useful to utilize the STEs (e.g., STEs 72, 76, 80, 82), and, more generally, the automata processor(s) 30 with a number of encoding techniques and automata processing embodiments to improve utilization of transition pattern symbol memory (e.g., state transition element (STE) memory array 58 of the automata processor(s) 30) and reduce array size of STEs when identifying data patterns. Indeed, as will be further described through various examples below, in certain embodiments, the automata processor(s) 30 and/or the processor 12 may encode sequential position information together with data pattern symbols to generate a position encoded pattern by which to compare data patterns and identify data patterns programmed on the automata processor(s) 30 within input data patterns. As the position encoded patterns and data symbols include position information, the states and transitions representing position information to identify sequential data patterns may be merged into a single or relatively low number of states and transitions with respect to each STE of the automata processor(s) 30.

Exact Data Pattern Match

Exact sequential data symbol pattern identification may allow the automata processor(s) 30 to identify each data symbol of an input data pattern with that of a stored sequential data pattern in the exact sequential order of the stored sequential data pattern without allowing for any mismatch errors, substitution errors, deletion errors, or insertion errors. For example, given a data pattern "abcd," the objective is to be able to identify any input data pattern starting with "abcd," in which the STE 72 may recognize the data symbol "a," and may be activated at the start of data pattern inputting. When an input data pattern starts with the data symbol "a," the STE 72 will be matched and activate STE 76. An activated STE 76 may be then able to recognize data symbol "b." Then, if data symbol "b" is following the first data symbol "a," the STE 76 will be matched and activate the STE 80. The STE 80 may recognize data symbol "c." If the data symbol "c" is the next input data symbol, the STE 80 will be matched and activate the STE 82. Lastly, if the next input symbol is exactly the data symbol "d," the reporting STE 82 will be matched and report that the data pattern has been identified within the input data pattern. If there is any position of the input pattern that does not match its corresponding STE, the automata processor(s) 30 may not report a match.

As an illustrative example, given a sequential symbol data pattern S="s1s2 . . . sL" with length L, and for any i where 1<=i<=L, s(i) is a symbol in alphabet with alphabet size A. The automata processor(s) 30 and/or the processor 12 may convert data pattern S into position encoded data pattern P="p1p2 . . . pL" by first defining a data symbol value for each data symbol in alphabet A (e.g., assign each symbol s(i) in the alphabet a unique value vi from 0 to A−1). The automata processor(s) 30 and/or the processor 12 may then generate a position encoded code p(i) for each s(i). The position encoded code p(i) may be calculated as: p(i)=v(i)+(i−1)*A, where v(i) is the symbol value for a given symbol s(i). Thus, the encoded data pattern may be data pattern of position encoded code "p1p2 . . . pL."

Using the same example data pattern "abcd," the alphabet of this example may include k (e.g., 4) possible symbols (e.g., {a, b, c, d}). The automata processor(s) 30 may define symbol values as: a=0, b=1, c=2, d=3. The generated position encoded code may be calculated as: Position 1 ("a"), p1=0+(1−1)*4=0, Position 2 ("b"), p2=1+(2−1)*4=5, Position 3 ("c"), p3=2+(3−1)*4=10, Position 4 ("d"), p4=3+(4−1)*4=15. Thus, the position encoded data pattern may be described as: P=(0)(5)(10)(15).

Figure 7:
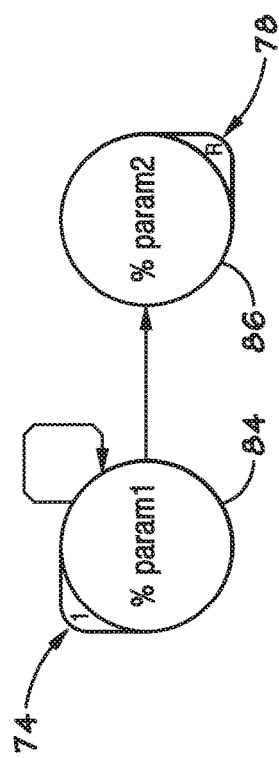

In certain embodiments, utilizing the present embodiments, the aforementioned data pattern "abcd" example as discussed above with respect to FIG. 6, may be performed utilizing the STEs 84 and 86 as illustrated in FIG. 7. For example, as depicted, the STE 84 (e.g., "% param1") may be set to recognize the position encoded symbols (0), (5), and (10). Similarly, STE 86 (e.g., "% param2"), for example, may be set to recognize symbol "(15)." Thus, when the position encoded data pattern "(0)(5)(10)(15)" representing "abcd" is input into the STE 84 (e.g., start-state STE), the first "(0)" will match the data of the STE 84, and thus the STE 84 and the STE 86 may be activated. The second symbol "(5)" may still match the STE 84, but not the STE 86. In such a case, the STE 84 and the STE 86 may each still be activated.

Similarly, the third input symbol "(10)" may also keep the STE 84 and the STE 86 activated, as the data of the STE 84 is matched, but STE 86 not matched. The last symbol "(15)" in the position encoded data pattern may match only the STE 86, and may thus report the identification of this pattern (e.g., as indicated by the report symbol 78 located in the lower right corner of the next-state STE 86). As may be appreciated, any position mismatch may result in a break at the corresponding STE, and thus the automata processor(s) 30 will not report a match.

In some embodiments, as may be appreciated, the above techniques may assume an ideal case, in which the number of different data symbols an STE can recognize may not be limited. In some embodiments, for example, as will be further appreciated, the maximum pattern length recognizable may be bounded by 1 plus the data symbol capacity of an STE C divided by the alphabet size A. (L<=(1+(C/A)). Thus, in such a case in which there is a limit for the number of different data symbols an STE may recognize, the following encoding technique may be utilized (which will be discussed in further detail below with respect to FIG. 14).

For example, the automata processor(s) 30 and/or the processor 12 may begin by defining a data symbol value for each symbol in alphabet A (e.g., assign each symbol s(i) in the alphabet A a unique value vi from 0 to A−1). The automata processor(s) 30 and/or the processor 12 may then determine the position value increase period T to be the smallest integer not less than L*A/C (T=CEIL(L*A/C)1), for example, where L is the data pattern length, A is the alphabets of the data pattern, and C is the data symbol capacity of an STE C. In this example, the automata processor(s) 30 and/or the processor 12 may define q(i) as the smallest integer not less than i/T, (q(i)=CEIL(i/T)). Thus, the position encoded code p(i) for each s(i) is calculated as: p(i)=vi+(q(i)−1)*A, and the encoded data pattern may be a data pattern of position encoded code "p1p2 . . . pL."

As an example of the aforementioned method, the following illustration identifies an exact pattern of "abcdbd," with the limitation that the maximum number of different symbols an STE can recognize is 8. The alphabet A is {a, b, c, d} with its size at 4:

1. Define symbol value:
    a=0, b=1, c=2, d=3;
2. t=CEIL(6*4/8)=3;
3. q1=CEIL(1/3)=1;
    q2=CEIL(2/3)=1;
    q3=CEIL(3/3)=1;
    q4=CEIL(4/3)=2;
    q5=CEIL(5/3)=2;
    q6=CEIL(6/3)=2.
4. Position encoded code:
    Position 1 ("a"), p1=0+(1−1)*4=0;
    Position 2 ("b"), p2=1+(1−1)*4=1;
    Position 3 ("c"), p3=2+(1−1)*4=2;
    Position 4 ("d"), p4=3+(2−1)*4=7;
    Position 5 ("b"), p5=1+(2−1)*4=5;
    Position 6 ("d"), p6=3+(2−1)*4=7.
5. Position encoded data pattern P=(0)(1)(2)(7)(5)(7).

Figure 8:
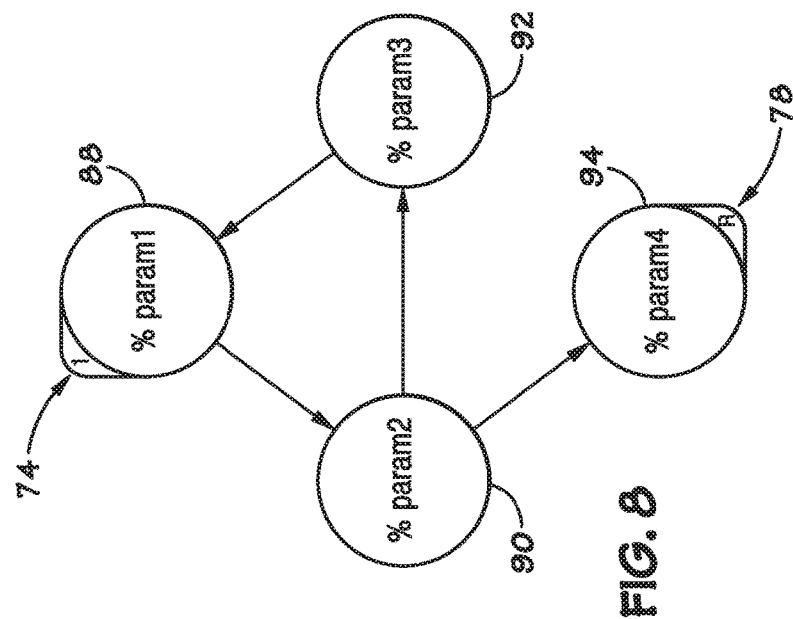

For example, based on the above method and encoding techniques, as will be further appreciated, the array of STEs (e.g., STEs 72, 76, 80, and 82) of the automata processor(s) 30 may be reduced into (L*A/C)+1 STEs (e.g. STEs 84 and 86) as illustrated with respect to FIG. 7. Furthermore, in certain embodiments, utilizing the present embodiments, the aforementioned data pattern "abcdbd" example as discussed above may be performed utilizing the STEs 88, 90, 92, and 94 (e.g., configured into a circular structure) as illustrated in FIG. 8. The STE 88 (e.g., "% param1" or a next-state STE) may be set, for example, to recognize position encoded data symbols (0) and (7) of the position encoded pattern (e.g., P=(0)(1)(2)(7)(5)(7)). The STE 90 (e.g., "% param2") may be set, for example, to recognize position encoded data symbols (1) and (5) of the position encoded pattern (e.g., P=(0)(1)(2)(7)(5)(7)). The STE 92 (e.g., "% param3") may be set, for example, to recognize position encoded data symbol (2). Similarly, the STE 94 (e.g., "% param4" or the reporting STE) may be set, for example, to recognize position encoded data symbol (7). While the extended position encoded pattern (e.g., P=(0)(1)(2)(7)(5)(7)) representing "abcdbd" may be input, the first "(0)" may match the STE 88 and activate the STE 90. The second position encoded data symbol "(1)" may match the STE 90, and activate the STE 92 and the STE 94.

In certain embodiments, the third symbol "(2)" may match the STE 92, but the third symbol "(2)" may not match the STE 94. Thus, the STE 88 may be activated again. The next position encoded data symbol "(7)" may match the STE 88, and then activate the STE 90. The next position encoded data symbol "(5)" may match the STE 90 and activate both STE 92 and STE 94 again. Finally, the last position encoded data symbol "(7)" in the position encoded pattern (e.g., P=(0)(1)(2)(7)(5)(7)) may match only the STE 94, and subsequently report the identification of this data pattern "abcdbd."

As may be appreciated from the aforementioned examples, any position (e.g., (0), (1), (2), (7), (5), (7)) mismatch may result in a break at the corresponding state (e.g., STE), and the automata processor(s) 30 may not report a match. In this way, this presently discussed technique may reduce the graph size to solve the previously discussed example with a graph size reduction rate of C/M (e.g., the symbol capacity of an STE divided by the alphabet size of the problem), and may thus overcome the limitation of maximum pattern length described in previous solution. As will be further appreciated with respect to FIGS. 9 and 10, it may be useful to expand the present method to find patterns in which the search may allow for one or more errors (e.g., mismatches, insertions, deletions, and so forth).

Approximate Data Pattern Match with Mismatch Error and Substitution Error Compensation In certain embodiments, the automata processor(s) 30 may be used to compensate for mismatch errors and substitution errors. In these embodiments, the data symbol positions may be encoded according to the following example of encoding "ACACTTGG" with alphabet of {A, C, T, G}:

Process of Encoding Sequential Positions and Symbols with Positions Shifts:
1. Define symbol value:
    A=0, C=1, T=2, G=3.
2. Position encoded code:
    Position 1 ("A"), p1=0+(1−1)*4=0 (range from 0 to 3);
    Position 2 ("C"), p2=1+(2−1)*4=5 (range from 4 to 7);
    Position 3 ("A"), p3=0+(3−1)*4=8 (range from 8 to 11);
    Position 4 ("C"), p4=1+(4−1)*4=13 (range from 12 to 15);
    Position 5 ("T"), p5=2+(5−1)*4=18 (range from 16 to 19);
    Position 6 ("T"), p6=2+(6−1)*4=22 (range from 20 to 23);
    Position 7 ("G"), p7=3+(7−1)*4=27 (range from 24 to 27);
    Position 8 ("G"), p8=3+(8−1)*4=31 (range from 28 to 31);
3. Position encoded data pattern P=(0)(5)(8)(13)(18)(22)(27)(31).

FIG. 9 illustrates an array 96 of STEs (e.g., STEs 98, 100, 102, 104, 106, 108, 110, 112, 114, 116, and 118) that may be useful in approximating a data pattern match with compensation for mismatch errors and substitution errors. As depicted, the STEs 98 (e.g., "M0"), 100 (e.g., "M1"), 102 (e.g., "M2"), 104 (e.g., "M3"), and 106 (e.g., "M4") may each represent memory states that may be used to store an position encoded identifiable data pattern (e.g., "(0)(5)(8)(13)(18)(22)(27)(31)" representing "ACACTTGG") and identify one or more position encoded input data pattern (e.g., input data pattern "(0)(6)(10)(13)(16)(20)(27)(31)" representing "ATTCAAGG"). For example, the STEs 98 (e.g., "M0"), 100 (e.g., "M1"), 102 (e.g., "M2"), 104 (e.g., "M3"), and 106 (e.g., "M4") may be set to recognize one or more of the derived position encoded pattern "(0)(5)(8)(13)(18)(22)(27)." The STEs 108 (e.g., "N1"), 110 (e.g., "N2"), 112 (e.g., "N3"), and 114 (e.g., "N4") may include "DON'T-CARE" functions that may be set to recognize any position encoded data symbol, and may thus allow the STEs 98 (e.g., "M0"), 100 (e.g., "M1"), 102 (e.g., "M2"), 104 (e.g., "M3"), and 106 (e.g., "M4") to recognize the data pattern "ACACT-TGG" in the input data pattern "A<u>TT</u>C<u>AA</u>GG" despite the mismatch and/or substitution errors (e.g., "<u>TT</u>" and "<u>AA</u>").

Similarly, the STEs 116 (e.g., "R1") and 118 (e.g., "R2") may include report STEs. In certain embodiments, as further depicted by FIG. 9, the report STE 116 (e.g., "R1") may receive inputs from the STEs 98 (e.g., "M0"), 100 (e.g., "M1"), 102 (e.g., "M2"), 104 (e.g., "M3"), and 106 (e.g., "M4"), 108 (e.g., "N1"), 110 (e.g., "N2"), and 112 (e.g., "N3"). For example, in one or more embodiments, the report STE 116 (e.g., "R1") may be set to recognize position encoded symbols "(28)(29)(30)(31)" (e.g., corresponding to Position 8 ("G"), p8=3+(8−1)*4=31 (range from 28 to 31)). Similarly, in one or more embodiments, the report STE 118 (e.g., "R2") may be set to recognize position encoded symbol "(31)." Thus, the present techniques may allow the automata processor(s) 30 to recognize an identifiable data pattern such as, for example, "ACACTTGG," in the input data pattern "A<u>TT</u>C<u>AA</u>GG" despite the mismatch and/or substitution errors (e.g., "<u>TT</u>" and "<u>AA</u>"). That is, the present techniques may compensate for certain errors (e.g., mismatch and/or substitution errors), and may thus report an input data pattern approximate match despite the errors (e.g., mismatch and/or substitution errors).

In certain embodiments, to implement the foregoing techniques of compensating for K errors (e.g., mismatch and/or substitution errors) when performing a data pattern at length of L characters, the automata processor(s) 30 may be configured according to the following process:
1. Set K+1 STEs M0~M(K) to recognized all p(i)'s with $1<=i<=L-1$;
2. Set k STEs N1~N(k) to be able to match any input symbol (*);
3. Set STE R1 to recognize any value within the value range of pL;
4. Set STE R2 to recognize pL;
5. For all the i with $0<=i<=K$, set M(i) to be activated by M(i);
6. For all the i with $1<=i<=K$, set N(i) to be activated by M(i−1), M(i) to be activated by N(i);
7. For all the i with $2<=i<=K$, set N(i) to be activated by N(i−1);
8. Set R1 to be activated by M0~M(K−1) and N1~N(K−1);
9. Set R2 to be activated by M(K) and N(K);
10. Set M0 and N1 as start-of-data STEs; and
11. The reporting element 119 (e.g., "OR" gate) is activated by R1 and R2.

For example, referring now to FIG. 10, arrays of STEs (e.g., arrays of STEs 120, 122, 124, 126, 128, 130, 132 and 134) may respectively correspond and illustrate each character of, for example, the input data pattern "A<u>TT</u>C<u>AA</u>GG" as it is processed by the automata processor(s) 30. In certain embodiments, as illustrated by the arrays of STE status (e.g., arrays of STEs 120, 122, 124, 126, 128, 130, 132 and 134), the STEs within the arrays of STEs (e.g., arrays of STEs 120, 122, 124, 126, 128, 130, and 132) may correspond to the STE memory STEs 98 (e.g., "M0"), 100 (e.g., "M1"), 102 (e.g., "M2"), 104 (e.g., "M3"), and 106 (e.g., "M4"), the "DON'T-CARE" STEs 108 (e.g., "N1"), 110 (E.g., "N2"), 112 (e.g., "N3"), and 114 (e.g., "N4"), and the STE report STEs 116 (e.g., "R1") and 118 (e.g., "R2"), as previously discussed with respect to FIG. 9. The error levels 136 may indicate the tracked error levels (e.g., error levels 138, 140, 142, 144, and 146 corresponding to rows of STEs and as illustrated in error levels 136) as the input data pattern "ATTCAAGG" is detected, for example, by the automata processor(s) 30. As depicted, the individual STEs (e.g., STEs 98, 100, 102, 104, 106, 112, 114, 116, and 118) of the respective arrays (e.g., arrays of STEs 120, 122, 124, 126, 128, 130, 132 and 134) designated as open circles with a "+" sign may each represent an activated STE, which includes a match of one or more of the position encoded symbols of, for example, the position encoded pattern P=(0)(5)(8)(13)(18)(22)(27)(31).

On the other hand, the STEs (e.g., STEs 98, 100, 102, 104, 106, 112, 114, 116, and 118) designated as open circles with a "−" sign may represent STEs that are activated, but may not include a match of one or more of the position encoded symbols of, for example, the position encoded pattern P=(0)(5)(8)(13)(18)(22)(27) (31). For example, during operation, for each instance in which the automata processor(s) 30 may detect a mismatch error associated with the data pattern (e.g., "ACACTTGG"), the top most matched STE may transition down one or more respective error levels. For example, during operation, the top most matched STE may transition from error level 138 (e.g., "0 Errors") to error level 140 (e.g., "1 Error") while detecting the first position encoded code for "T" (e.g., Position 5: ranging from position values (16) to (19)). Similarly, the top most matched STE may transition from error level 140 (e.g., "1 Error") to error level 142 (e.g., 2 Errors) while detecting the second position encoded code for "T" (e.g., Position 6: ranging from position values (20) to (23)). All other STEs indicated as solid closed circles may each represent deactivated STEs.

The top most matched STE may then transition from error level 142 (e.g., "2 Errors") to error level 144 (e.g., "3 Errors") while detecting an "A" at array 128 (position 5) (e.g., mismatch because "A" appears at positions 1 and 3 in the original sequential data pattern "ACACTTGG"). Likewise, the top most matched STE may then transition from error level 144 (e.g., "3 Errors") to error level 146 (e.g., "4 Errors") while detecting an "A" at array 130 (position 6) (e.g., mismatch because "A" appears at positions 1 and 3 in the original sequential data pattern "ACACTTGG"). Otherwise, the topmost matched STE will stay at the same error level. Thus, compared to the exact data pattern match techniques described above, this solution may handle approximate pattern matching with mismatch errors and substitution errors. Thus, as previously noted above with respect to FIG. 9, the present techniques may allow the automata processor(s) 30 to recognize a stored identifiable data pattern such as, for example, "ACACTTGG," in the input data pattern "ATTCAAGG" despite the mismatch and/or substitution errors (e.g., "TT" and "AA").

Approximate Data Pattern Match with Insertion Error and Deletion Error Compensation In certain embodiments, it may be useful to expand the present techniques to compensate for insertion errors and deletion errors in detecting a given data pattern in an input data pattern. For example, as previously discussed above with respect to FIGS. 9 and 10, the present embodiments may allow identification of an input data pattern (e.g., "ATTCAAGG") including a K number of errors (e.g., mismatch errors, substitution errors, insertion errors, deletion errors, and so forth) from an identifiable sequential data pattern (e.g., "ACACTTGG") utilizing the present embodiments of transition pattern symbol memory while concurrently reducing the graph size of automata as part of the automata processor(s) 30.

The present techniques of utilizing the automata processor(s) 30 to identify an approximate match of an identifiable sequential data pattern in an input data pattern may, in some embodiments, be best understood by way of example. For example, given an identifiable sequential data pattern "ACACTTGG" with alphabet A={A, C, T, G}, the automata processor(s) 30 may identify (e.g., via one or more STEs 60) any input data pattern including up to a K number of errors (e.g., mismatch errors, substitution errors, insertion errors, deletion errors, and so forth) different from the identifiable sequential data pattern "ACACTTGG," for example.

In one embodiment, the automata processor(s) 30 may identify an input data pattern such as, for example, "ATTCAAGG," as an approximate match of the identifiable sequential data pattern "ACACTTGG" because only the underlined k positions or data symbols "TT" (e.g., mismatch error) and "AA" (e.g., mismatch error) are different from the identifiable sequential data pattern "ACACTTGG." Similarly, the automata processor(s) 30 may identify an input data pattern such as, for example, "A--CTAAG" because the data symbols "AA" are simply mismatched from the data symbols in the original identifiable sequential data pattern "ACACTTGG" at positions (5) and (6), while the data symbols "CA" are merely deleted (e.g., as represented by "--") from the original identifiable sequential data pattern "ACACTTGG."

In another example, the automata processor(s) 30 may identify an input data pattern such as, for example, "A(TT)CACTAAG" as an approximate match, as the data symbols "TT" simply represent an insertion of data symbols at positions "2" and "3" (e.g., positions counted from left to right) and the data symbols "AA" again represents a mismatch from the data symbols "TG" at positions "5" and "6" in the original identifiable sequential data pattern "ACACTTGG." In this way, the automata processor(s) 30 may identify approximate match of a given sequential data pattern (e.g., "ACACTTGG") in any input data pattern in spite of a k number of errors (e.g., mismatch errors, substitution errors, insertion errors, deletion errors, and so forth) being included in the input data pattern (e.g., "ATTCAAGG," "A--CTAAG," "A(TT)CACTAAG," and so forth).

In certain embodiments, for the automata processor(s) 30 to compensate for insertion errors and deletion errors, the data symbol positions may be encoded on the automata processor(s) 30 as previously discussed above with the addition that the automata processor(s) 30 may consider data symbol position shifts (e.g., one or more position shifts to the right or one or more position shifts to the left) that may be otherwise engendered by an insertion error and/or deletion error.

Process of Encoding Sequential Positions and Symbols with Positions Shifts:

Given a position shift s, |s|<=K, in which s=0 means no position shifts, s<0 means positions shift left (deletions), s>0 means positions shift right (insertions):

1. Define a symbol value for each symbol in alphabet A, and assign each symbol in alphabet A a unique value from 0 to A−1. For each symbol si in data pattern S, it will have its corresponding symbol value vi.
2. The position encoded code p(i) for each s(i)-s is calculated as:

$p(i)=v(i-s)+(i-1)*A;$ a) if s>0, let p(i)-s~p0 empty (not encode any symbol);
    b) if s<0, let p(i)~p(i)-s empty (not encode any symbol);

3. The encoded data pattern is a data pattern of position encoded code "p1p2 . . . pL+s."

The following includes an example of the aforementioned process of encoding sequential positions and symbols with positions shifts to compensate not only for mismatch errors and substitution errors, but to compensate also for insertion errors and deletion errors when identifying an identifiable sequential data pattern in a given input data pattern. As previously discussed above, while the present example includes a 4-bit encoding, in other embodiments, the encoding techniques may be applied to any N-bit data pattern (e.g., 5-bits, 8-bits, 16-bits, 32-bits, 64-bits, 128-bits, and so forth). Furthermore, while the present example includes data symbol position shift of 2, it should be appreciated that the present techniques may be adapted to include any k number of data symbol position shifts.

Example

"ACACTTGG" with position shift s=−1.
1. Define symbol value:
   A=0, C=1, T=2, G=3.
2. Position encoded code:
   Position 1 ("C"), p1=1+(1−1)*4=1 (range from 0 to 3);
   Position 2 ("A"), p2=0+(2−1)*4=4 (range from 4 to 7);
   Position 3 ("C"), p3=1+(3−1)*4=9 (range from 8 to 11);
   Position 4 ("T"), p4=2+(4−1)*4=14 (range from 12 to 15);
   Position 5 ("T"), p5=2+(5−1)*4=18 (range from 16 to 19);
   Position 6 ("G"), p6=3+(6−1)*4=23 (range from 20 to 23);
   Position 7 ("G"), p7=3+(7−1)*4=27 (range from 24 to 27); and
   Position 8 ("−").
3. Position encoded data pattern P=(1)(4)(9)(14)(18)(23)(27).

Example

"ACACTTGG" with position shift s=2.
1. Define symbol value:
   A=0, C=1, T=2, G=3.
2. Position encoded code:
   Position 1 (−);
   Position 2 (−);
   Position 3 ("A"), p3=0+(3−1)*4=8 (range from 8 to 11);
   Position 4 ("C"), p4=1+(4−1)*4=13 (range from 12 to 15);
   Position 5 ("A"), p5=0+(5−1)*4=16 (range from 16 to 19);
   Position 6 ("C"), p6=1+(6−1)*4=21 (range from 20 to 23);
   Position 7 ("T"), p7=2+(7−1)*4=26 (range from 24 to 27);
   Position 8 ("T"), p5=2+(8−1)*4=30 (range from 28 to 31);
   Position 9 ("G"), p6=3+(9−1)*4=35 (range from 32 to 35);
   Position 10 ("G"), p7=3+(10−1)*4=39 (range from 36 to 39);
3. Position encoded data pattern P=(8)(13)(16)(21)(26)(30)(35)(39).

As illustrated by the above example, the position encoded pattern P includes position shifts at position "1" (e.g., "−") and position "2" (e.g., "−") for insertion errors. The remaining data symbols of the identifiable sequential data pattern (e.g., "ACACTTGG") may be encoded at positions "3"-position "10."

Figure 11:
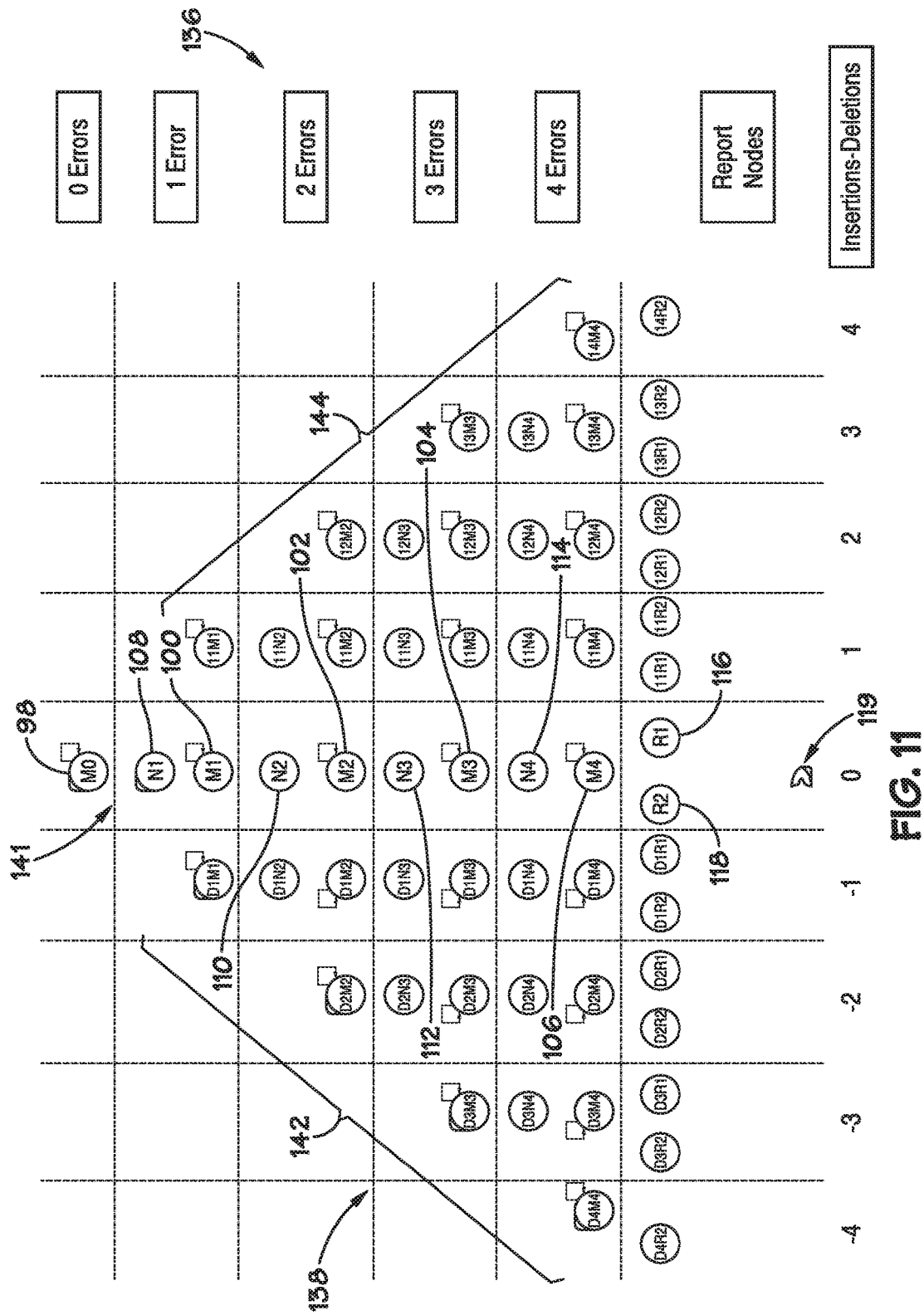
FIGS. 11-13 illustrate block diagrams of STEs and examples of identifying sequential data patterns including deletion errors and insertion errors, in accordance with an embodiment.

In certain embodiments, to compensate for insertion errors and deletion errors when identifying an identifiable sequential data pattern in a given input data pattern, the automata processor(s) 30, and more specifically, the STEs (e.g., STEs 60) of the automata processor(s) 30 may be configured according to the following processes set forth below and illustrated, for example, by the array of STEs 138 in FIG. 11. It should be appreciated that, although not illustrated, the array of STEs 138 in FIG. 11, and, by extension, the STEs of FIGS. 12 and 13 may include various transition paths between the individual STEs in accordance with aspects of the techniques discussed herein:

Column Definition:
1. Define Column (s, K) as the following (e.g., as illustrated in FIG. 11 by the column 141 of STEs 98):
   a. Set K+1 STEs M(s)~M(K) to recognized all p(i)'s with position shift s as previously encoded above and 1<=i<=L−1+s (e.g., as illustrated in FIG. 11 by the STE memory STEs 98 ("M0"), 100 ("M1"), 102 ("M2"), 104 ("M3"), and 106 ("M4"));
   b. Set k STEs N(s+1)~Nk to be able to match any input symbol ("*") (e.g., as illustrated in FIG. 11 by the STEs 108 ("N1"), 110 ("N2"), 112 ("N3"), and 114 ("N4"));
   c. Set STE R1 to recognize any value within the value range of pL+s with position shift s (e.g., as illustrated in FIG. 11 by report STEs 116 ("R1") and 118 ("R2");
   d. Set STE R2 to recognize pn+s with position shift s;
   e. For all the i with s<=i<=K, set M0 to be activated by M(i);
   f. For all the i with s+1<=i<=K, set N(i) to be activated by M(i−1), M(i) to be activated by N(i);
   g. For all the i with s+2<=i<=K, set N(i) to be activated by N(i−1);
   h. Set R1 to be activated by M(s)~M(K−1) and N(s)~N(K−1);
   i. Set R2 to be activated by M(K) and N(K);
   j. The reporting OR element is activated by R1 and R2 (e.g., as illustrated in FIG. 11 by the "OR" gate 119).

Create Column for No Insertion or Deletion Position Offset:
2. Create column (0,K), set M0 and N1 to take inputs from start state.

Create Columns for Deletion and Insertion Position Offsets:
3. For s=1 to the number of deletion allowed to identify a match (E), create column (s, k) with prefix D(s) to all the STEs of the column being created. Then set all D(s)M(s) to take inputs from start-of-data.
4. For s=1 to the number of insertion allowed to identify a match (F), create column (s, k) with prefix −I(s) to all the STEs of the column being created.

Handle Deletion Errors:
5. For all the 0<=s<=E and 0<=i<=K;
   a. Set M(i) and activate all existing D(s)M(s+i), D(s)N(s+i+1) (e.g., configuring the automata processor(s) 30 to compensate for deletion errors is illustrated in FIG. 11 by the subarray 142 of deletion memory STEs ("DxMy"), "DON'T CARE" STEs ("DxNy"), and report STEs ("DxRy")) to be activated by M(i);
   b. For all s that s<K−i, set all existing D(s)R1 to be activated by M(i);

c. For s=K−1, set D(K−i)R2 (if existing) to be activated by M(i);
d. For all the 1<=j<=E and j<=s<=E:
  i. Set every existing D(j)M(i) and activate all existing D(s)M(s+i−j) and D(s)N(s+i−j+1) to be activated by every existing D(j)M(i);
  ii. Set D(j)M(i) and activate all existing D(s)R1 with s that s<K−I to be activated by D(j)M(i);
  iii. Set D(j)M(i) and activate D(K−i)R2 (if existing) to be activated by D(j)M(i).
e. For all the 1<=j<=F, and −E<=s<=F:
  i. Set all existing following elements to be activated by every existing I(j)M(i):
    i. I(s)M(j−s+i) and I(s)N(j−s+i+1) for s>0;
    ii. M(j+i) and N(i+j+1) for s=0;
    iii. D(−s)M(j+s+i) and D(−s)N(j+s+i+1) for s<0.
  ii. Set I(j)M(i) and activate all existing following elements to be activated by I(j)M(i):
    i. If j−K+i>0:
      1. I(s)R1 for all s that j−K+i<s<j;
    ii. If j−K+i=0:
      1. I(s)R1 for all s that 0<s<j;
      2. R1 for s=0;
    iii. If j−K+i<0:
      1. I(s)R1 for all s that 0<s<j;
      2. R1 for s=0;
      3. D(−s)R1 for all s that j K+i<s<0.
    iv. Set the following elements to be activated by I(j)M(i):
      1. I(j−K+i)R2, if j−K+i>0;
      2. R2, if j−K+i=0;
      3. D(K−i−j), if j−K+i<0.

Handle Insertion Errors:
6. For 1<=i<=K−1,
  a. Set N(i) and activate I1M(i), I1N(i+1), and I1R1 (e.g., configuring the automata processor(s) 30 to compensate for insertion errors is illustrated in FIG. 11 by the subarray 144 of insertion memory STEs ("IxMy"), "DON'T CARE" STEs ("IxNy"), and report STEs ("IxRy"));
  b. For 1<=j<=F−1, set every existing I(j)N(i) and activate I(j+1)M(i), I(j+1)N(i+1) and I(j+1)R1;
  c. For 1<j<=E, set every existing D(j)M(i) and activate D(j−1)M(i), D(j−1)N(i+1), and D(j−1)R1;
  d. Set D1N(i) and activate M0, N(i+1), and R1;
7. Set N(K) and activate I1M(K) and I1R2;
8. For 1<=j<=F−1, set every existing I(j)N(K) and activate I(j+1)M(K) and I(j+1)R2;
9. For 1<j<=E, set every existing D(j)M(K) and activate D(j−1)M(K) and D(j−1)R2;
10. Set D1N(K) and activate M(K) and R2.

Figure 12:
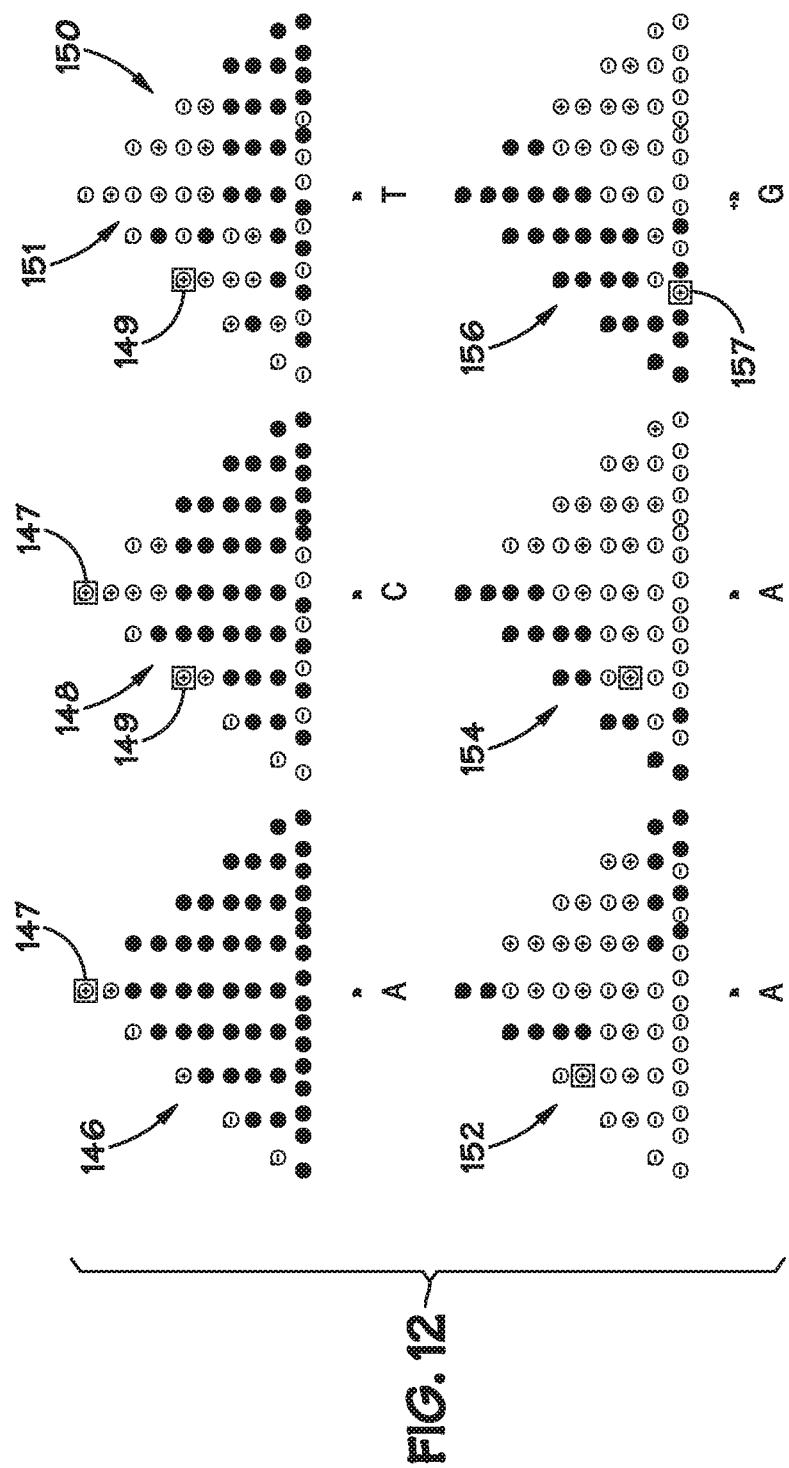
Figure 13:
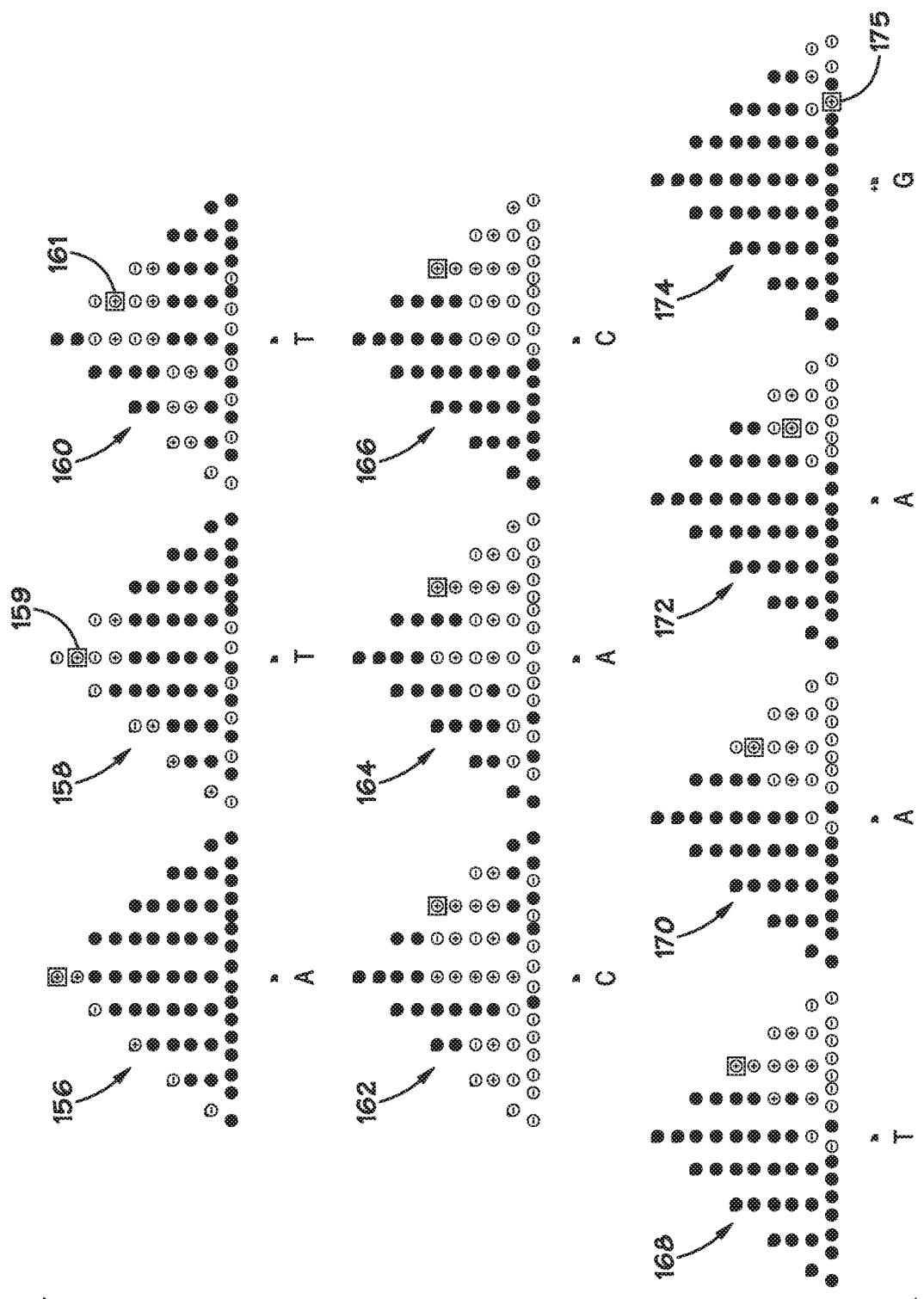

Turning now to FIGS. 12 and 13, each figure illustrates respective examples of the automata processor(s) 30 identifying a sequential data pattern (e.g., "ACACTTGG") within an input data pattern that includes, for example, at most total of K (e.g., 4 in the present example) deletion or insertion errors and mismatch errors (e.g., "ACTAAG" in FIG. 12 and "ATTCACTAAG" in FIG. 13). For example, referring first to FIG. 12, arrays of STEs status (e.g., arrays of STEs 146, 148, 150, 152, 154, and 156) may respectively correspond and illustrate streaming each character of, for example, the pattern encoded input data "(0)(5)(10)(12)(16)(23)" representing "ACTAAG". In certain embodiments, as illustrated by the arrays of STEs status (e.g., arrays of STEs 146, 148, 150, 152, 154, and 156), the STEs status within the arrays of STEs 142, 144, 146, 148, 150, and 152 may correspond to the memory STEs 98 (e.g., "M0"), 100 (e.g., "M1"), 102 (e.g., "M2"), 104 (e.g., "M3"), and 106 (e.g., "M4"), the "DON'T-CARE" STEs 108 (e.g., "N1"), 110 (e.g., "N2"), 112 (e.g., "N3"), and 114 (e.g., "N4"), and the report STEs 116 (e.g., "R1") and 118 (e.g., "R2"), as previously discussed with respect to FIGS. 9 and 10.

For example, referring to FIG. 12, for each instance in which the automata processor(s) 30 may detect a mismatch error associated with the sequential data pattern (e.g., "ACACTTGG"), the top most matched STE 147 may transition down two or more respective error levels and the previous STEs may be deactivated. The array 146 (e.g., "A") illustrates the activated (matched and mismatched) and deactivated STEs for the first data symbol "A" of the input data pattern (e.g., "ACTAAG"), which may be reported as match of the first data symbol (e.g., "A") of the original identifiable sequential data pattern (e.g., "ACACTTGG"). The array 148 (e.g., "C") illustrates the activated (matched and mismatched) and deactivated STEs for the data symbol "C" of the input data pattern (e.g., "ACTAAG"), which may be reported as match of the second data symbol (e.g., "C") of the original identifiable sequential data pattern (e.g., "ACACTTGG"). As illustrated, the STE 149 may be indicated as two deletions before the data symbol "C." (e.g., underlined "CA" is deleted from "ACACTTGG") Furthermore, as also depicted by the array 148, additional memory and "DON'T CARE" STEs (e.g., in a vertical direction down the column corresponding to the STE 147) may be activated and indicated with a "+" sign due to the match of the data symbol "C." This may occur as part of the present techniques of utilizing the automata processor(s) 30 (e.g., specifically, the ability of the automata processor(s) 30 to search for all the possible paths simultaneously) to attempt to compensate for the deletion errors and insertion errors (e.g., via one or more position shifts and/or state transitions via the STEs).

The array 150 (e.g., "T") illustrates the activated (matched and mismatched) and deactivated STEs for the data symbol "T" of the input data pattern (e.g., "ACTAAG"), while the arrays 152 and 154 (e.g., "A" and "A") illustrate the activated (matched and mismatched) and deactivated STEs for the data symbol "A" of the input data pattern (e.g., "ACTAAG"). In the example of the array 150, because a data symbol "T" is detected at position "3" (e.g., as opposed to a data symbol "T" at position "5" or "6" as in the original sequential data pattern "ACACTTGG"), the STEs (e.g., in a vertical direction down the column 151) may include a total of 3 memory STEs and 3 "DON'T CARE" STEs activated, in which the memory STEs may be indicated with a "−" sign (e.g., indicating a mismatch due to the detected deletion of data symbols "CA" of the original sequential data pattern "ACACTTGG") and the memory STE 149 may be indicated with a "+" sign (e.g., indicating a match since deletions are allowed). In the examples of the arrays 152 and 154, the data symbols "A" and "A" of the respective arrays 152 and 154 is detected as mismatches at positions (4) and (5) (e.g., "AA" is a mismatch of "TG" in the original sequential data pattern "ACACTTGG"). The arrays 152 and 154 indicate the STEs (e.g., deletion and insertion STEs) activated to compensate for the "AA" mismatch. Lastly, the array 156 illustrates a match of the data symbol "G" at position (6) of the input data pattern (e.g., "ACTAAG") corresponding to position (8) of the original sequential data pattern (e.g., "ACACTTGG"), and thus reports a match of the original sequential data pattern (e.g., "ACACTTGG") with the input data pattern (e.g., "ACTAAG") as indicated by the "+" sign reporting STE 157.

Referring now to FIG. 13, arrays of STEs (e.g., arrays 156, 158, 160, 162, 164, 166, 168, 170, 172, and 174) may respectively correspond and illustrate the input of each character of, for example, the pattern encoded input data representing "ATTCACTAAG." In certain embodiments, as discussed with respect to FIG. 12, the STEs within the arrays of STEs 156, 158, 160, 162, 164, 166, 168, 170, 172, and 174 may correspond to the memory STEs 98 (e.g., "M0"), 100 (e.g., "M1"), 102 (e.g., "M2"), 104 (e.g., "M3"), and 106 (e.g., "M4"), the "DON'T-CARE" STEs 108 (e.g., "N1"), 110 (e.g., "N2"), 112 (e.g., "N3"), and 114 (e.g., "N4"), and the report STEs 116 (e.g., "R1") and 118 (e.g., "R2"), as previously discussed with respect to FIGS. 9 and 10.

In certain embodiments, the arrays of STEs (e.g., arrays 156, 158, 160, 162, 164, 166, 168, 170, 172, and 174) illustrated by FIG. 13 may operate similar to the arrays of STEs (e.g., arrays of STEs 146, 148, 150, 152, 154, and 156) in FIG. 12. Specifically, while FIG. 12 illustrates how the automata processor(s) 30 may compensate for deletion errors, FIG. 13 illustrates how the automata processor(s) 30 may compensate for insertion errors. For example, the arrays 158 (e.g., "T") and 160 (e.g., "T") illustrates the activated (matched and mismatched) and deactivated insertion STEs for the data symbols "TT" of the input data pattern (e.g., "ATTCACTAAG"), which each represents an insertion error with respect to the original sequential data pattern "ACACTTGG." In the example of the arrays 158 and 160, because the data symbols "TT" is detected at positions (2) and (3) (e.g., as opposed to a data symbols "C" and "A" at positions (2) and (3) as in the original sequential data pattern "ACACTTGG"), the activated "DON'T CARE" STEs (e.g., in a vertical direction down the column 159 and the column 161) may be indicated with a "+" sign (e.g., indicating a match since insertions are allowed). The activated memory STEs (e.g., in a vertical direction down the column 159 and the column 161) may be indicated as with a "−" sign (e.g., indicating a mismatch due to the detected insertion of data symbols "TT" into the original sequential data pattern "ACACTTGG").

Similar to FIG. 12, in the examples of the arrays 170 and 172, the data symbols "A" and "A" of the respective arrays 170 and 172 is detected as mismatches at positions (7) and (8) (e.g., "AA" is a mismatch of "TG" in the original sequential data pattern "ACACTTGG"). The arrays 170 and 172 indicate the STEs (e.g., deletion and insertion STEs) activated to compensate for the "AA" mismatch. For example, the array 174 illustrates a match of the data symbol "G" at position (6) of the input data pattern (e.g., "ACTAAG") corresponding to position (8) of the original sequential data pattern (e.g., "ACACTTGG"), and thus reports a match of the original sequential data pattern (e.g., "ACACTTGG") with the input data pattern (e.g., "ACTAAG") as indicated by the "+" sign reporting STE 175.

Generalized Approximate Data Pattern Match Technique with Mismatch, Substitution, Deletion, and Insertion Error Compensation and Increased Data Length Capacity In certain embodiments, it may be useful to further expand the present techniques to compensate for mismatch errors and substitution errors and insertion and deletion errors, as discussed above, with techniques to increase the data length capacity, which may be limited by the symbol capacity of individual STEs of the automata processor(s) 30 in the previous embodiments described above. This may further decrease the array size and complexity of the automata processor(s) 30 increase the processing efficiency of the automata processor(s) 30 for larger approximate data pattern match problems.

Figure 14:
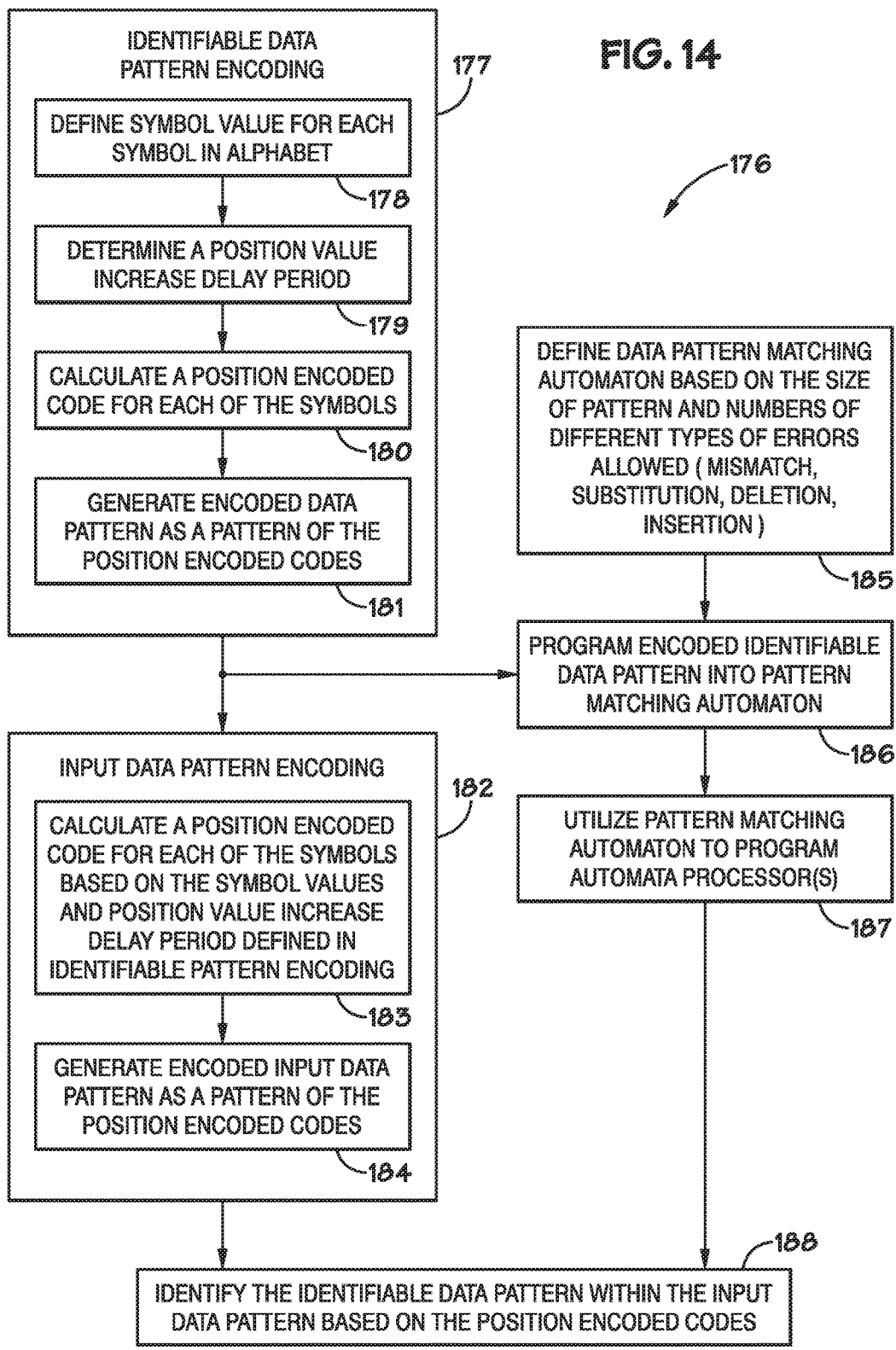
FIG. 14 is a flowchart illustrating an embodiment of a process useful in identifying sequential data patterns within one or more input data patterns via encoding sequential data symbol position information together with the data pattern symbols by using the automata processing structure of FIG. 4, in accordance with an embodiment.

Turning now to FIG. 14, a flow diagram is presented, illustrating an embodiment of a process 176 useful in identifying sequential data patterns within one or more input data patterns via encoding sequential data symbol position information together with the data pattern symbols and by using, for example, the processor 12 in conjunction with the automata processor(s) 30 depicted, for example, in FIGS. 1 and 3. The process 176 may include instructions (e.g., code) stored in a non-transitory machine-readable medium (e.g., the system memory 26) and executed, for example, by the processor 12 and/or automata processor(s) 30. Indeed, as depicted by FIG. 14, the process 176 may include sub-processes 177 and 182, in which the sub-process 177 may include the process of encoding an identifiable data pattern while the sub-process 182 may include the process of encoding an input data pattern. In one embodiment, the sub-processes 177, 182, 185, and 186 may be performed by the processor 12, and the remaining steps of the process 176 may be performed by the automata processor(s) 30. It should also be appreciated that one or more steps of the process 176 may be performed in a different order, or may be performed concurrently with one or more other steps of the process 176.

With the foregoing in mind, the process 176 may begin with the processor 12 defining (block 178 of sub-process 177) a data symbol value for each data symbol in the alphabet (which can be any string of communication characters, for example). For example, the system may assign each symbol $s(i)$ in the alphabet a unique value $v(i)$ from 0 to $A-1$. The process 176 may continue with the processor 12 determining (block 179 of sub-process 177) a position value increase delay period. For example, the system may determine a position value increase delay period t to be the smallest integer not less than L*A/C (e.g., the product of the data pattern length L and the alphabet size A divided by the symbol capacity of an STE C: T=CEIL(L*A/C)).

The process 176 may then continue with the processor 12 calculating (block 180 of sub-process 177) a position encoded code for each of the data symbols in the identifiable sequential data pattern. For example, as previously discussed, a position encoded code $p(i)$ may be calculated for each data symbol $s(i)$ of input data pattern as: $p(i)=v(i-s)+(q(i)-1)*A$, for which if $s>0$, then $p(i-s)\sim p0$ and for which if $s<0$, then $p(i)\sim p(i-s)$. The process 176 may then continue with the processor 12 generating (block 181 of sub-process 177) an encoded sequential data pattern as a pattern of position encoded codes (e.g., p1p2 . . . p(L+s)).

The process 176 may then continue with the processor 12 calculating (block 183 of sub-process 182) a position encoded code for each of the data symbols in the input data pattern based on the data symbol values and position value increase delay period of the encoded identifiable data pattern. The process 176 may then continue with the processor 12 generating (block 184 of sub-process 182) an encoded input data pattern as a pattern of position encoded codes (e.g., p1p2 . . . p(L+s)).

In certain embodiments, as further illustrated in FIG. 14, the process 176 may continue with the processor 12 defining (block 185) a data pattern matching automaton based on the size of the identifiable pattern and a number of various errors allowed in identifying the identifiable data pattern. For example, as discussed above with respect to FIGS. 9-13, the processor 12 in conjunction with the automata processor(s)

30 may compensate for mismatch errors and substitution errors, as well as insertion and deletion errors when identifying an identifiable sequential data pattern in an input data pattern.

The process 176 may then continue with the processor 12 programming (block 186) the encoded identifiable data pattern into a data pattern matching automaton (e.g., by way of the STEs 98, 100, 102, 104, 106, 108, 110, 112, 114, 116, and 118 of the automata processor(s) 30 as initially discussed above with respect to FIGS. 9, 10, and 11). The process 176 may then continue with the automata processor(s) 30 utilizing (block 187) the pattern matching automaton to program the automata processor(s) 30. For example, the processor 12 may compile the position encoded codes of the identifiable data pattern into an automaton that can be programmed onto automata processor(s) 30. The process 176 may then conclude with the automata processor(s) 30 identifying (block 188) the identifiable data pattern within the input data pattern based on the position encoded codes of the identifiable data pattern and the position encoded input data pattern, as well as the pattern matching automaton. For example, the program compiled automaton (e.g., programmed onto the automata processor(s) 30) may allow the automata processor(s) 30 to identify the identifiable data pattern or other sequential data pattern within the input data pattern.

Process of Encoding Sequential Positions and Symbols with Positions Shifts:

Given a position shift s, $|s|<=K$, in which s=0 means no position shifts, s<0 means positions shift left (deletions), s>0 means positions shift right (insertions):

The following includes an example of the aforementioned process of encoding sequential positions and symbols with positions shifts to compensate not only for mismatch errors and substitution errors, but to compensate also for insertion errors and deletion errors when identifying an identifiable sequential data pattern in a given input data pattern. As previously discussed above, while the present example includes a 4-bit encoding, in other embodiments, the encoding techniques may be applied to any N-bit data pattern (e.g., 5-bits, 8-bits, 16-bits, 32-bits, 64-bits, 128-bits, and so forth). Furthermore, while the present example includes data symbol position shift of 2, it should be appreciated that the present techniques may be adapted to include any k number of data symbol position shifts.

Example

"ACACTTGG" with position shift s=−1.
1. Define symbol value:
A=0, C=1, T=2, G=3
2. q1=CEIL(1/3)=1;
   q2=CEIL(2/3)=1;
   q3=CEIL(3/3)=1;
   q4=CEIL(4/3)=2;
   q5=CEIL(5/3)=2;
   q6=CEIL(6/3)=2;
   q7=CEIL(7/3)=3.
3. Position encoded code:
   Position 1 ("C"), p1=1+(1−1)*4=1 (range from 0 to 3);
   Position 2 ("A"), p2=0+(1−1)*4=0 (range from 0 to 3);
   Position 3 ("C"), p3=1+(1−1)*4=1 (range from 0 to 3);
   Position 4 ("T"), p4=2+(2−1)*4=6 (range from 4 to 7);
   Position 5 ("T"), p5=2+(2−1)*4=6 (range from 4 to 7);
   Position 6 ("G"), p6=3+(2−1)*4=7 (range from 4 to 7);
   Position 7 ("G"), p7=3+(3−1)*4=11 (range from 8 to 11);
   Position 8 ("−").
4. Position encoded string P=(1)(0)(1)(6)(6)(7)(11).

Example

"ACACTTGG" with position shift s=2.
1. Define symbol value:
A=0, C=1, T=2, G=3
2. q1=CEIL(1/3)=1;
   q2=CEIL(2/3)=1;
   q3=CEIL(3/3)=1;
   q4=CEIL(4/3)=2;
   q5=CEIL(5/3)=2;
   q6=CEIL(6/3)=2;
   q7=CEIL(7/3)=3;
   q8=CEIL(8/3)=3;
   q9=CEIL(9/3)=3;
   q7=CEIL(10/3)=4.
3. Position encoded code:
   Position 1 (−);
   Position 2 (−);
   Position 3 ("A"), p3=0+(1−1)*4=0 (range from 0 to 3);
   Position 4 ("C"), p4=1+(2−1)*4=5 (range from 4 to 7);
   Position 5 ("A"), p5=0+(2−1)*4=4 (range from 4 to 7);
   Position 6 ("C"), p6=1+(2−1)*4=5 (range from 4 to 7);
   Position 7 ("T"), p7=2+(3−1)*4=10 (range from 8 to 11);
   Position 8 ("T"), p5=2+(3−1)*4=10 (range from 8 to 11);
   Position 9 ("G"), p6=3+(3−1)*4=11 (range from 8 to 11);
   Position 10 ("G"), p7=3+(4−1)*4=15 (range from 12 to 15);
4. Position encoded string P=(0)(5)(4)(5)(10)(10)(11)(15).

As illustrated by the above example, the position encoded pattern P includes position shifts at position "1" (e.g., "−") and position "2" (e.g., "−") for compensating position shifts caused by insertion errors. The remaining data symbols of the identifiable sequential data pattern (e.g., "ACACT-TGG") may be encoded at positions "3"-position "10."

In certain embodiments, to compensate for insertion errors and deletion errors when identifying an identifiable sequential data pattern in a given input data pattern, the automata processor(s) 30, and more specifically, the STEs (e.g., STEs 60) of the automata processor(s) 30 may be configured according to the following processes set forth below and illustrated, for example, by the array of STEs 138 in FIG. 11:

Column Definition:
1. Define Column (s, K, T), where s is the position shift, K is the total substitution error allowed in the problem, and T is the position value increase period determined by the encoding described above:
   a. For all p(i)'s encoded with s position shifts and i meet $s<=i<L−|s|$, let r(i) be the remainder of (i−s)/T, p(i) is set to be recognized by STEs M(|s|)T(r(i),)~M(K)T(r(i));
   b. Set STEs N(i)T(j) for all $s<i<=K$, and $0<=j<T$ recognize any input symbol (*)
   c. For all M(i)T(j) with $|s|<=i<=K$:
      i. Set M(i)T0 to be activated by M(i)T(T−1);
      ii. Set M(i)T(j) ($1<=j<T$) activated by M(i)T(j−1).
   d. For all N(i)T(j) with $s<i<=K$:
      i. Set N(i)T0 to be activated by N(i−1)T(T−1);
      ii. Set M(i)T0 to be activated by M(i−1)T(T−1);
      iii. Set M(i)T0 to be activated by N(i)T(T−1);

iv. Set N(i)T(j) (1<=j<T) to be activated by N(i−1)T(j−1);
v. Set N(i)T(j) (1<=j<T) to be activated by M(i−1)T(j−1);
vi. Set M(i)T(j) (1<=j<T) to be activated by N(i)T(j−1).

e. The report STE R1 is defined to recognize all the possible values at the same value range of p(L−s) (e.g. T*(L−s−1)~T*(L−s)−1);
f. The report STE R2 is defined to recognize p(L−s); Let r be the remainder of (L−1)/T. Set R1 to be activated by STEs M(i)T(r) (s<=i<K) and STEs N(j)T(r) (s<j<K), R2 to be activated by M(K)T(r) and N(K)T(r).

Figure 15:
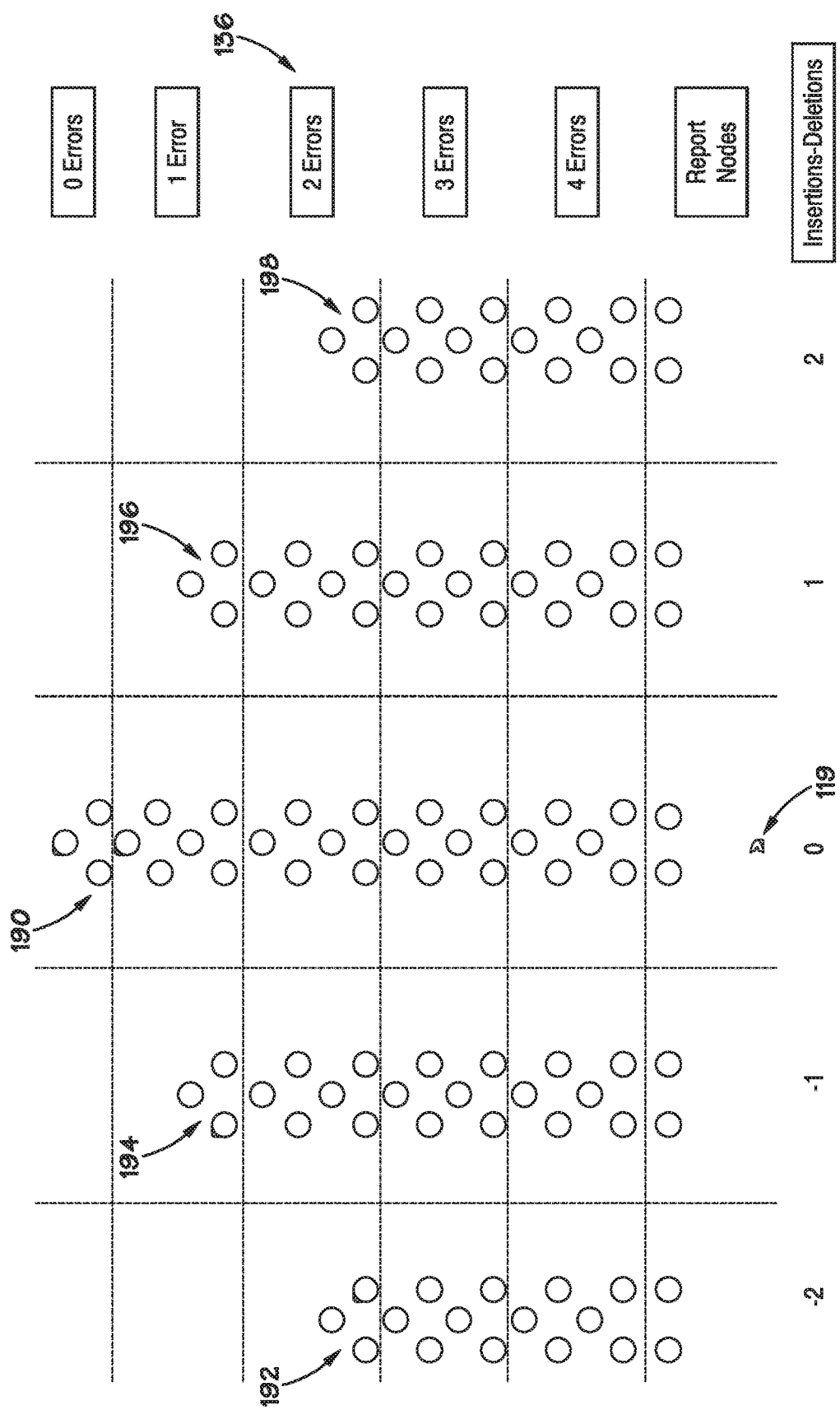

Create Column for No Insertion or Deletion Position Offset:

2. Create column (0, K, T), set M0T0 and N1T0 take inputs from start-of-data. FIG. 15 illustrates an example of this via the column 190 of STEs.

Create Columns for Deletion and Insertion Position Offsets:

3. For s=1 to the number of deletion allowed to identify a match (E), create column (s, K, T) with prefix D(s) to all the STEs of the column being created. Set all D(s)M(s)T0 take inputs from start-of-data.
4. For s=1 to the number of insertion allowed to identify a match (F), create column (s, K, T) with prefix I(s) to all the STEs of the column being created.

For example, as illustrated in FIG. 15, the columns 192 and 194 of STEs represent columns for the deletion error position offsets, while the columns 196 and 198 of STEs represent columns for the insertion error position offsets. As noted above with respect to FIGS. 11, 12, and 13, it should be appreciated that, although not illustrated, the arrays of STEs in FIG. 15, and, by extension, the arrays of STEs in FIGS. 16, 17A, and 17B may include various transition paths between the individual STEs in accordance with aspects of the techniques discussed herein.

Handle Deletion Errors:

In the following steps, define REMAINDER((x/y) be the remainder of x divided by y, if the remainder is 0, let REMAINDER((x/y)=y.

Define m=REMAINDER((L−1)/T)

5. For all the 0<=s<=E, 0<=i<=K and 0<=j<T
   a. Set all existing D(s)M(s+i)T(REMAINDER((j+s+1)/T)) and D(s)N(s+i+1)T(REMAINDER((j+s+1)/T)) to be activated by M(i)T(j)
   b. For all s that s<K−i, set all existing D(s)R1 to be activated by M(i) T(REMAINDER((L−s−1)/T));
   c. For s=K−i, Set D(s)R2 (if existing) to be activated by M(i) T(REMAINDER((L−s−1)/T);
   d. For all the 1<=k<=E and k<=s<=E:
      i. Set all existing D(s)M(s+i−k) T(REMAINDER((j+s−k+1)/T) and D(s)N(s+i−k+1)T(REMAINDER((j+s−k+1)/T) to be activated by every existing D(k)M(i)T(j);
      ii. Set all existing D(s)R1 with s that s<K−i+k Set D(j)M(i) and activate D(K−i)R2 (if existing) to be activated by D(k)M(i)T(REMAINDER(m−s+k)/T);
      iii. Set \D(K−i+k)R2 (if existing) to be activated by D(k)M(i)T(REMAINDER(m−K+i)/T).
   e. For all the 1<=k<=F and −E<=s<k:
      i. Set all existing following elements to be activated by every existing I(k)M(i)T(j):

i. I(s)M(k−s+i)T(REMAINDER((j+k−s+1)/T) and I(s)N(ks+i+1)T(REMAINDER((j+k−s+1)/T) for s>0;
      ii. M(k+i)T (REMAINDER((j+k+1)/T)) and N(k+i+1)T (REMAINDER((j+k+1)/T) for s=0;
      iii. D(−s)M(k−s+i) T(REMAINDER((j+k−s+1)/T) and D(−s)N(k−s+i+1)T(REMAINDER((j+k−s+1)/T) for s<0;
      ii. Set all existing following elements to be activated by I(j)M(i):
      i. If j−K+i>0:
         1. I(s)R1 for all s that j−K+i<s<j;
      ii. If j−K+i=0:
         1. I(s)R1 for all s that 0<s<j;
         2. R1 for s=0;
      iii. If j−K+i<0:
         1. I(s)R1 for all s that 0<s<j;
         2. R1 for s=0;
         3. D(−s)R1 for all s that j K+i<s<0.
      iv.:
         1. I(1−K+i)R2, if j−K+i>0;
         2. R2, if j−K+i=0;
         3. D(K−i−j), if j−K+i<0.

Handle Insertion Errors:

6. For 1<=i<=K−1, 0<=j<T, define m that R2 is activated by M(K)T(m)
   a. Set I1M(i)T(j), I1N(i+1)T(j) to be activated by N(i)T(j);
   b. Set I1M(K)T(j) to be activated by N(K)T(j);
   c. Set I1R1 to be activated by N(i)T(m+1);
   d. Set I1R2 to be activated by N(K)T(m+1);
   e. For 1<=k<=F−1:
      i. Set I(k+1)M(i)T(j), I(k+1)N(i+1) T(j) to be activated by every existing I(k)N(i)T(j);
      ii. Set I(k+1)M(K)T(j) to be activated by I(k)N(K) T(j);
      iii. Set I(k+1)R1 to be activated by I(k)N(i)T(m+1);
      iv. Set and activate I(k+1)R2 to be activated by I(k)N(K)T(m+1).
   f. For 1<=k<=F−1:
      i. Set D(k−1)M(i)T(j), D(j−1)N(i+1)T(j) to be activated by every existing D(k)N(i)T(j);
      ii. Set D(k−1)M(K)T(j) to be activated by D(k)N(K) T(j);
      iii. Set D(k−1)R1 to be activated by D(k)N(i)T(m+1);
      iv. Set D(k−1)R2 to be activated by D(k)N(K)T(m+1).
   g. Set M(i)T(j), N(i+1)T(j) to be activated by D1N(i)T(j);
   h. Set M(K)T(j) to be activated by D1N(K)T(j);
   i. Set R1 to be activated by D1N(i)T(m+1);
   j. Set R2 to be activated by D1N(K)T(m+1).

Figure 16:
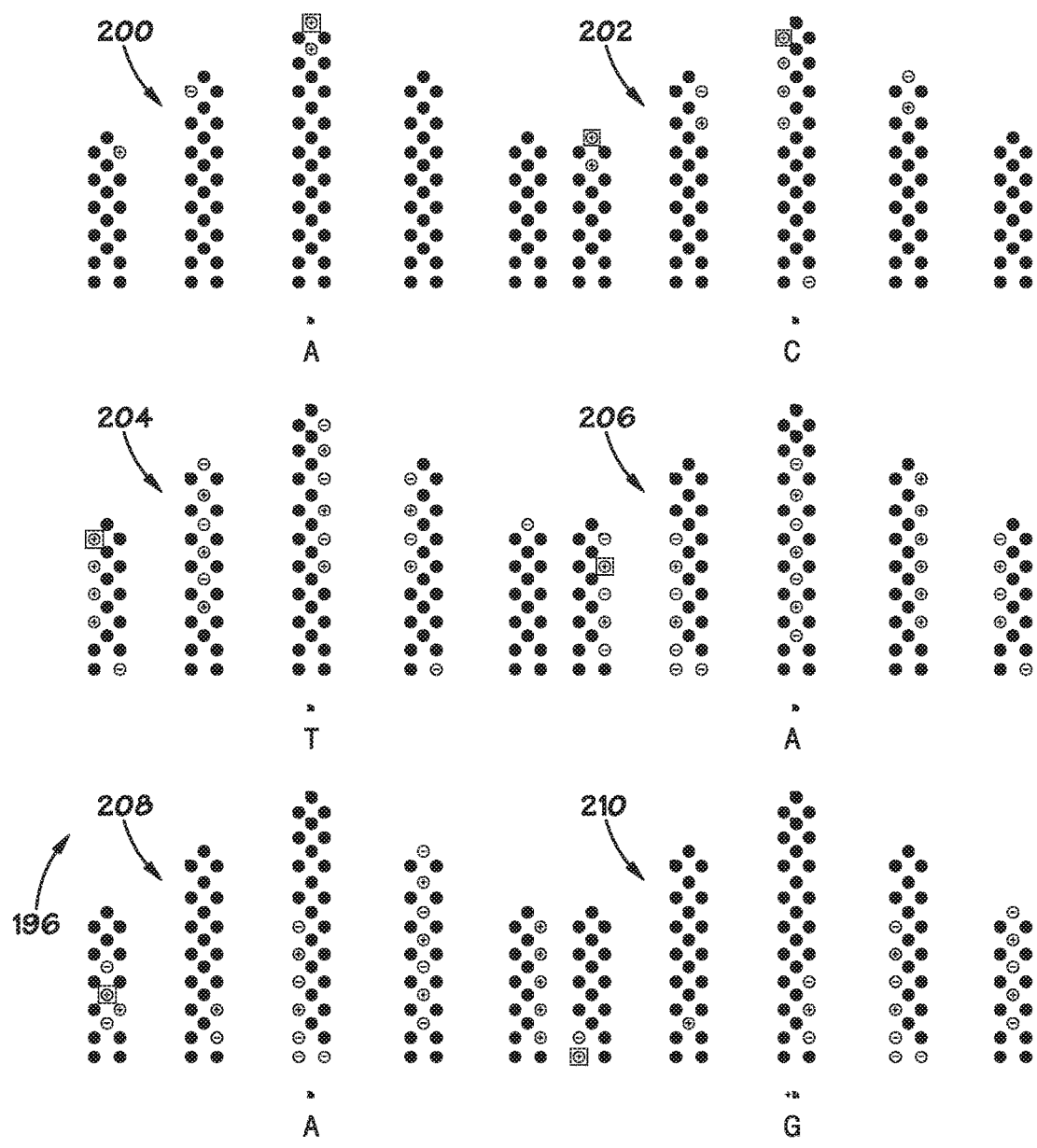
Figure 17A:
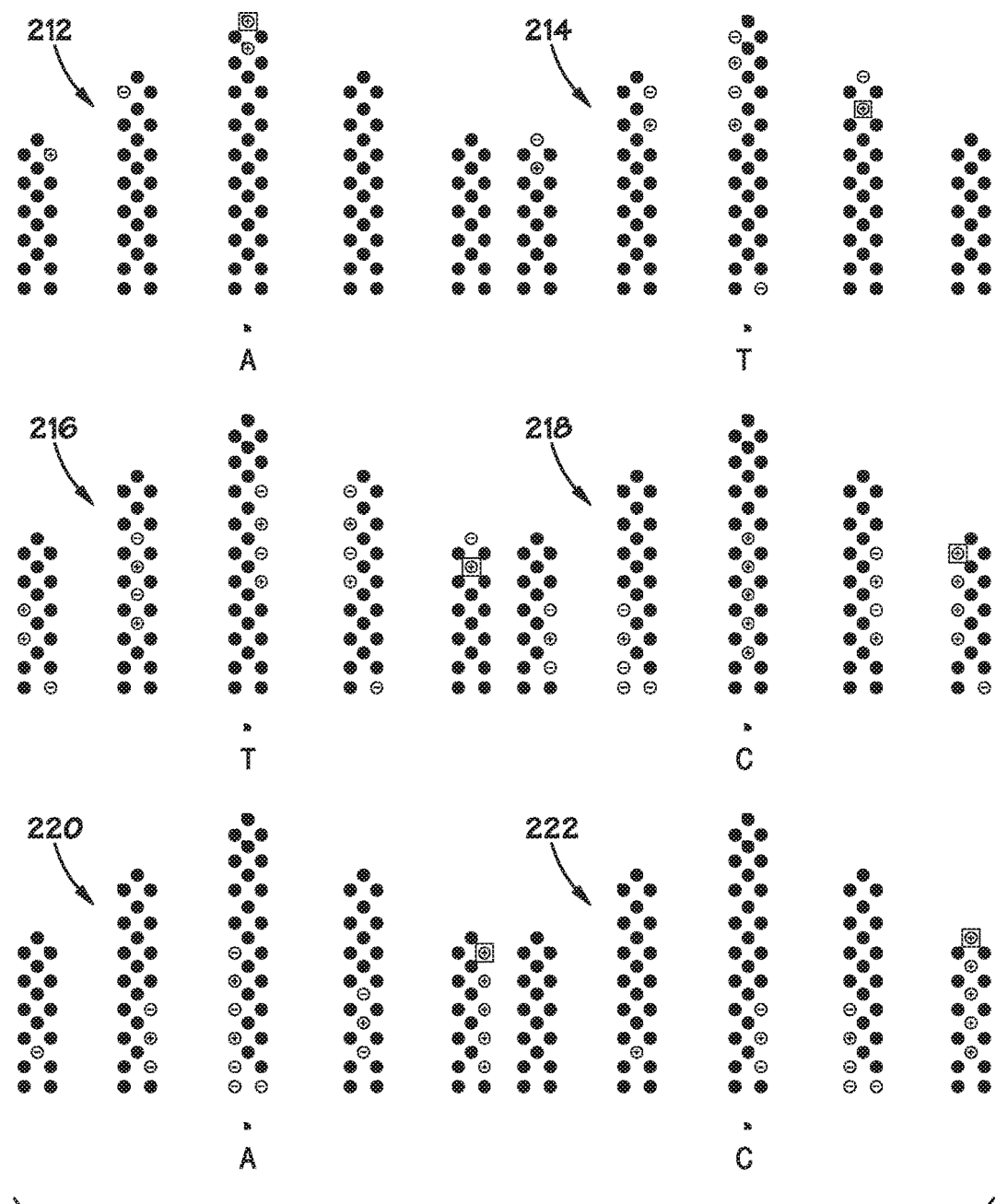
Figure 17B:
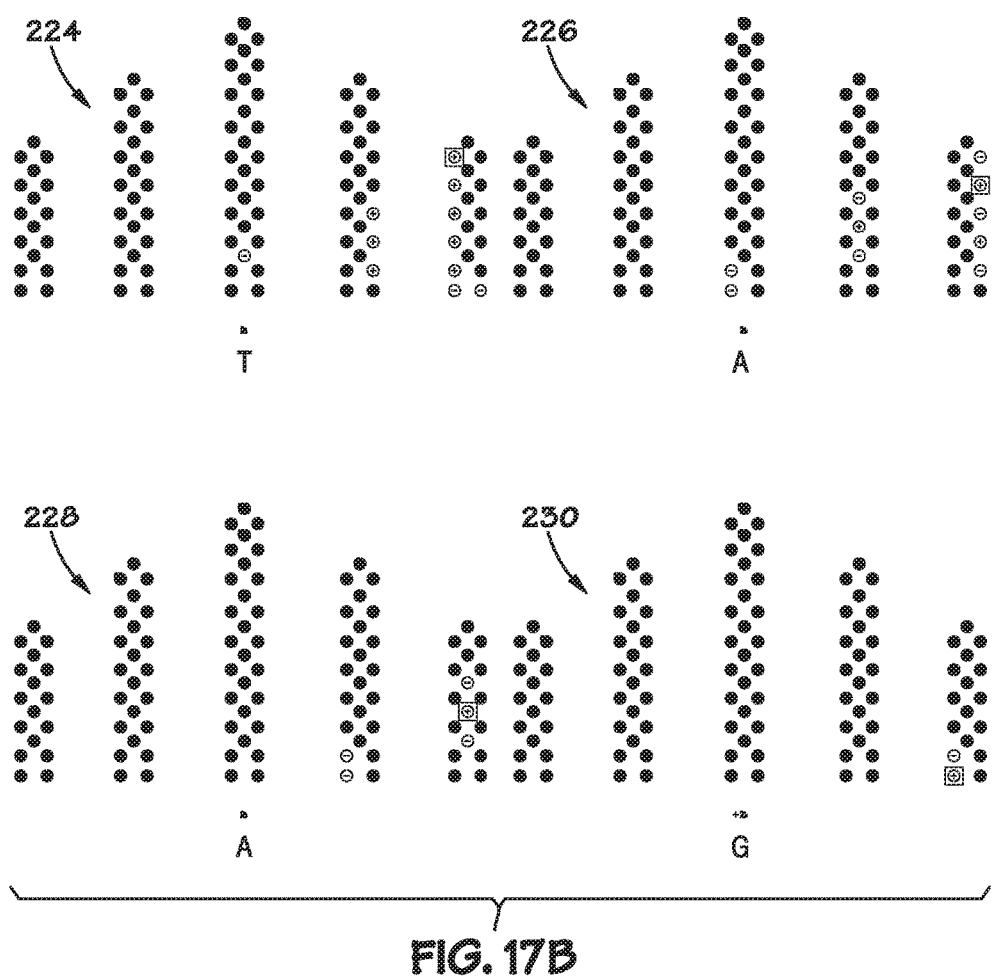

Turning now to FIGS. 16 and 17A and 17B, each figure illustrates respective examples of the automata processor(s) 30 identifying a sequential data pattern (e.g., "ACACT-TGG") within an input data pattern that includes, for example, k (e.g., 2 in the present example) deletion errors and k mismatch errors (e.g., "ACTAAG" in FIG. 16 and "ATTCACTAAG" in FIG. 17). Specifically, in certain embodiments, FIGS. 16 and 17A and 17B may respectively correspond to FIGS. 12 and 13, but for fact that the arrays of STEs (e.g., arrays of STEs 200, 202, 204, 206, 208, and 210) of FIG. 16 and the arrays of STEs (e.g., arrays of STEs 212, 214, 216, 218, 220, 222, 224, 226, 228, and 230) of FIG. 17 may allow each STE to recognize any number of data symbols of a data pattern.

For example, as discussed above, for each position shift s, data symbol data capacity C for each STE may be unbounded such that each STE of the arrays of STEs 200, 202, 204, 206, 208, and 210 of FIG. 16 and the arrays of STEs 212, 214, 216, 218, 220, 222, 224, 226, 228, and 230 may recognize any number of various data symbols. In this way, the automata processor(s) 30 may approximate a match between a given sequential data pattern (e.g., "ACACT-TGG") and a given input data pattern (e.g., "ATTCACTAAG") of any length. Indeed, as may be appreciated by FIGS. 16 and 17A and 17B, the individual columns of STEs may be increased to any number depending, for example, on the length, size, or structure of the data patterns to be identified.

While the invention may be susceptible to various modifications and alternative forms, specific embodiments have been illustrated by way of example in the drawings and have been described in detail herein. However, it should be understood that the invention may be not intended to be limited to the particular forms disclosed. Rather, the invention may be to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
    calculating a first position encoded pattern based on a first data pattern;
    programming an automata processor with the first position encoded pattern to reduce a size of a state transition element (STE) array of the automata processor utilized in a data pattern search relative to a search utilizing the first data pattern;
    encoding an input data stream to generate a second position encoded pattern;
    transmitting the second position encoded pattern to the automata processor; and
    using the automata processor to compare the first position encoded pattern to the second position encoded pattern to identify a second data pattern within the first data pattern as the data pattern search by the automata processor.

2. The method of claim 1, wherein calculating the first position encoded pattern comprises calculating a position value for each respective data symbol of the first data pattern.

3. The method of claim 1, wherein the second position encoded pattern is calculated based on the second data pattern.

4. The method of claim 1, wherein calculating the first position encoded pattern comprises calculating the first position encoded pattern based on a numerical value of each data symbol of the first data pattern.

5. The method of claim 1, wherein using the automata processor to compare the first position encoded pattern to the second position encoded pattern comprises using the automata processor to compare, in a sequential order, the first position encoded pattern to the second position encoded pattern.

6. The method of claim 1, wherein using the automata processor to compare the first position encoded pattern to the second position encoded pattern comprises using the automata processor to identify the second data pattern within the first data pattern when the first data pattern comprises a mismatch between one or more data symbols in a sequential order.

7. The method of claim 1, wherein using the automata processor to compare the first position encoded pattern to the second position encoded pattern comprises using the automata processor to identify the second data pattern within the first data pattern when the first data pattern comprises a substitution of one or more data symbols in a sequential order.

8. The method of claim 1, wherein using the automata processor to compare the first position encoded pattern to the second position encoded pattern comprises using the automata processor to identify the second data pattern within the first data pattern when the first data pattern comprises a deletion of one or more data symbols of the first data pattern.

9. The method of claim 1, wherein using the automata processor to compare the first position encoded pattern to the second position encoded pattern comprises using the automata processor to identify the second data pattern within the first data pattern when the first data pattern comprises an insertion of one or more additional data symbols.

10. An apparatus, comprising:
    one or more processors configured to:
        calculate a first position encoded pattern based on a first data pattern;
        encode an input data stream to generate a second position encoded pattern; and
        compare the first position encoded pattern to a second position encoded pattern to identify a second data pattern within the first data pattern as a data pattern search utilizing a reduced size of a state transition element (STE) array of an automata processor in the data pattern search relative to a search utilizing the first data pattern.

11. The apparatus of claim 10, wherein the one or more processors are configured to compare the first position encoded pattern to the second position encoded pattern to identify an approximate match of the second data pattern within the first data pattern.

12. The apparatus of claim 10, wherein at least one of the one or more processors comprise a plurality of state transition elements (STEs) in the STE array.

13. The apparatus of claim 12, wherein each of the plurality of STEs is configured to identify respective position values of the second position encoded pattern and to report an approximate match between the first data pattern and the second data pattern when a plurality of the respective position values are identified in the first position encoded pattern.

14. The apparatus of claim 10, wherein the first data pattern comprises a mismatch of one or more data symbols of the second data pattern, a substitution of one or more data symbols of the second data pattern, a deletion of one or more data symbols of the second data pattern, an insertion of one or more additional data symbols with respect to the second data pattern, or any combination thereof.

15. A method for identifying a sequential data pattern within an input data pattern, comprising:

calculating a plurality of position values each corresponding to one or more data symbols of the sequential data pattern;

generating a position encoded pattern based on the sequential data pattern, wherein the position encoded pattern comprises the plurality of position values;

encoding the input data pattern to generate an encoded data pattern; and loading the position encoded pattern onto one or more automatons of an automata processor such that the position encoded pattern and the encoded data pattern may be utilized to identify the sequential data pattern within the input data pattern based on the plurality of position values as a data pattern search utilizing a reduced size of a state transition element (STE) array of an automata processor in the data pattern search relative to a search utilizing the first data pattern.

16. The method of claim 15, comprising determining a position value increase delay period to allow each state transition element (STE) of a plurality of STEs of the STE array of the automata processor to identify lengthy data patterns.

17. The method of claim 16, wherein determining the position value increase delay period comprises defining the position value increase delay period as the smallest integer not less than a product of the sequential data pattern length or the input data pattern length and a size of the sequential data pattern divided by a data symbol capacity of one or more STEs of the plurality of STEs.

18. A device, comprising:
a processor, comprising:
a plurality of state transition elements (STEs) in a STE array, wherein a reduced number of the plurality of STEs are used in a data pattern search of an encoded input data stream relative to a search of the input data stream, the plurality of STEs comprising:
a first STE configured to identify one or more position encoded values generated based on a first data pattern to identify the first data pattern within a received second data pattern generated by encoding of the input data stream; and
a second STE configured to be activated when the one or more position encoded values of the first data pattern matches one or more position encoded values of the second data pattern, and to report an approximate match between the first data pattern and the second data pattern as the data pattern search by the processor.

19. The device of claim 18, wherein the plurality of STEs comprises a plurality of memory STEs, a plurality of "Don't care" term STEs, and one or more reporting STEs.

20. The device of claim 18, wherein the plurality of STEs comprises a first plurality of columns of STEs dedicated to activate and detect deletion errors and a second plurality of columns of STEs dedicated to activate and detect insertion errors to identify an approximate match between the first data pattern and the second data pattern.

21. The device of claim 18, wherein the second STE is configured to report an approximate match between the first data pattern and the second data pattern when a latter portion of the one or more position encoded values of the first data pattern matches a latter portion of the one or more position encoded values of the second data pattern.

22. The device of claim 18, comprising a third STE coupled to the first STE and the second STE, wherein a coupling between the first STE, the second STE, and the third STE comprises a circular structure.

23. The device of claim 18, wherein the one or more position encoded values of the first data pattern are generated based at least in part on a position value increase delay period.

24. The device of claim 23, wherein the one or more position encoded values of the second data pattern are generated based at least in part on the position value increase delay period.

25. The device of claim 18, wherein the first STE is configured to store a plurality of position encoded values corresponding to the stored first data pattern.

* * * * *